Nov. 7, 1950  A. R. MORRILL  2,529,095
SHOE MACHINE
Filed May 15, 1946  20 Sheets-Sheet 1

Witness
Jas. J. Maloney.

Inventor
Alfred R. Morrill, Dec'd.
Ruth W. Morrill, Adm'x
by her Attorney
Maxwell Fish Nov. 7, 1950 A. R. MORRILL 2,529,095
SHOE MACHINE
Filed May 15, 1946 20 Sheets-Sheet 5

Inventor
Alfred R. Morrill, Dec'd.
Ruth W. Morrill, Adm'x.
by her Attorney
Maxwell Fish Witness
Jas J Maloney

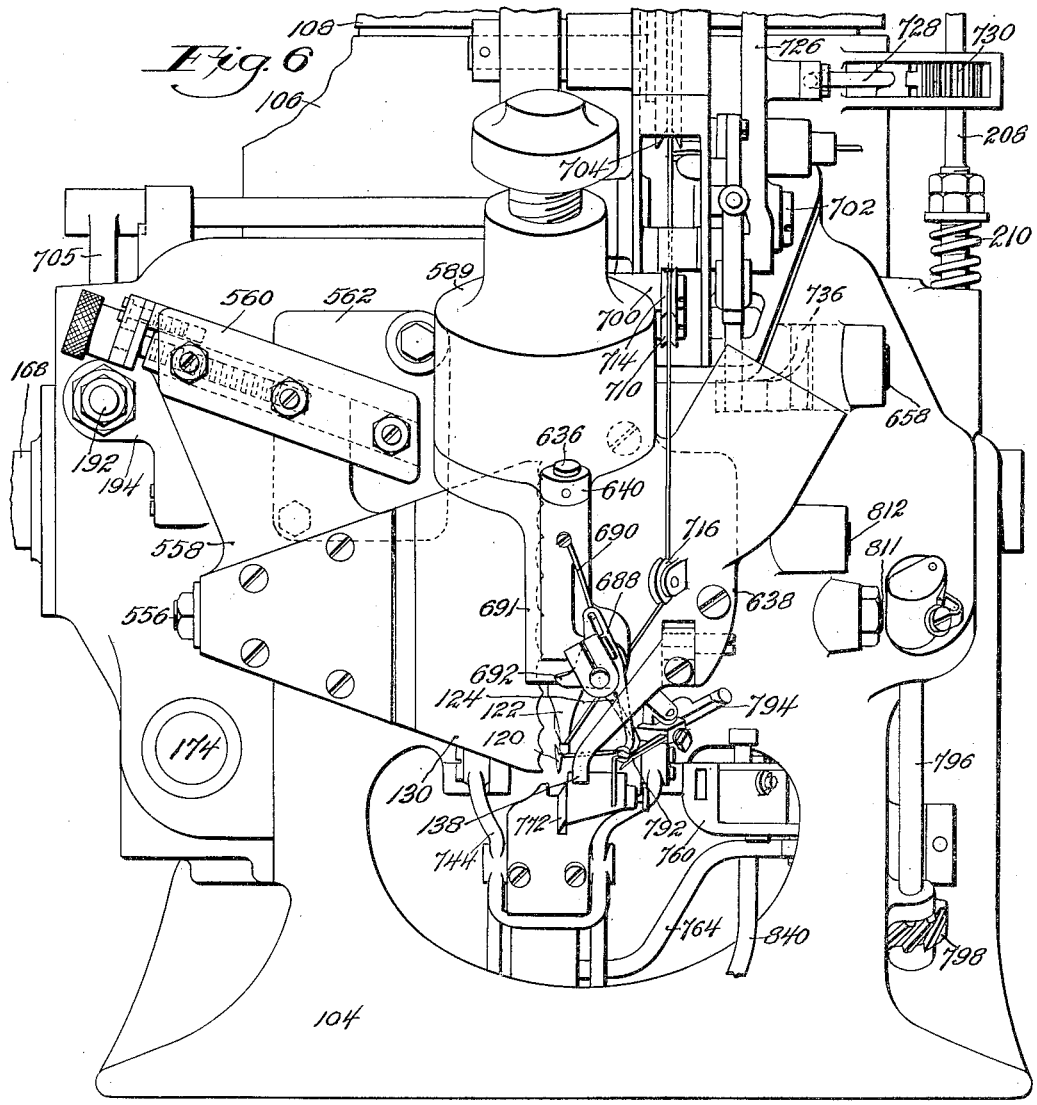

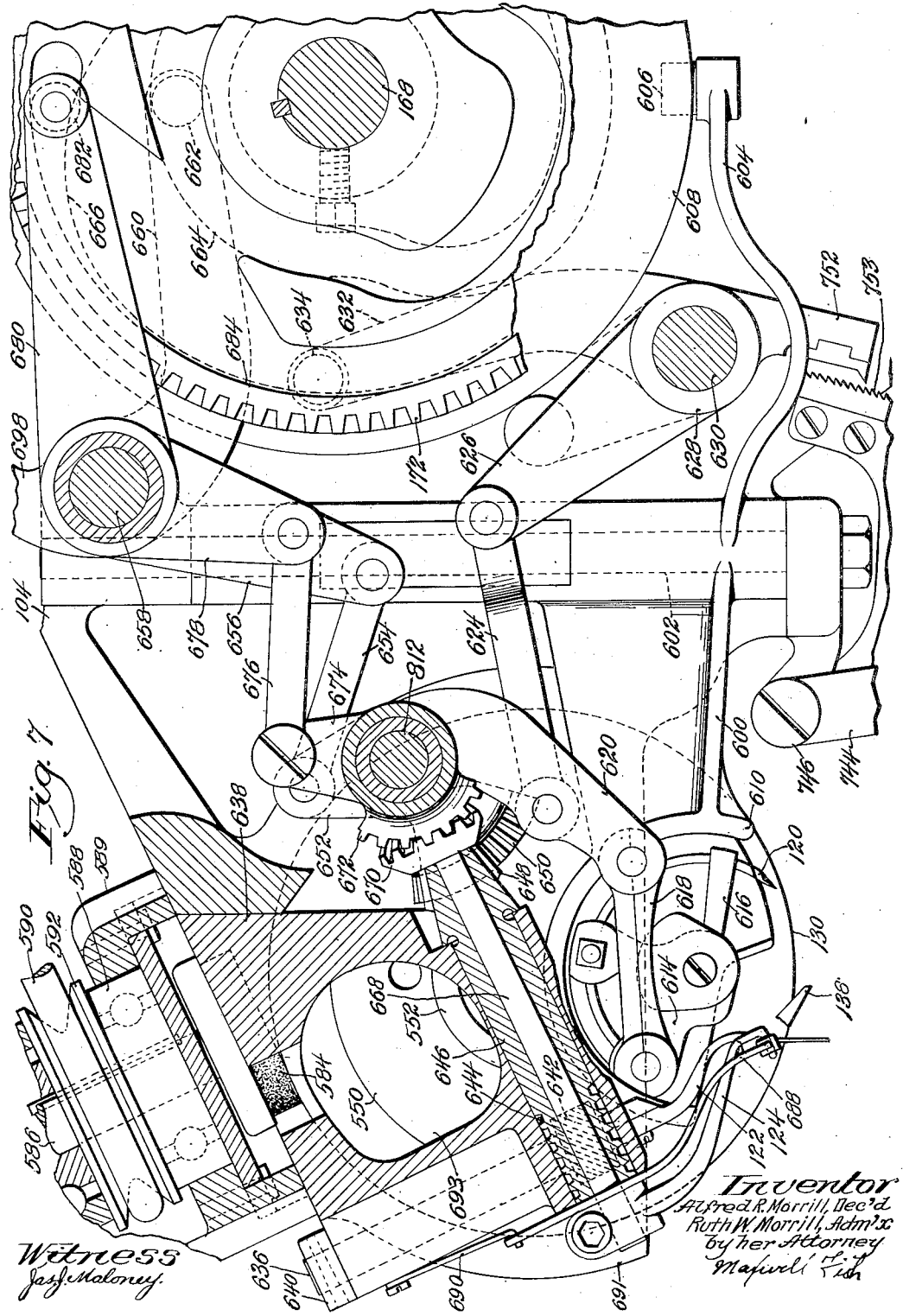

Nov. 7, 1950         A. R. MORRILL         2,529,095
                      SHOE MACHINE
Filed May 15, 1946                     20 Sheets-Sheet 8
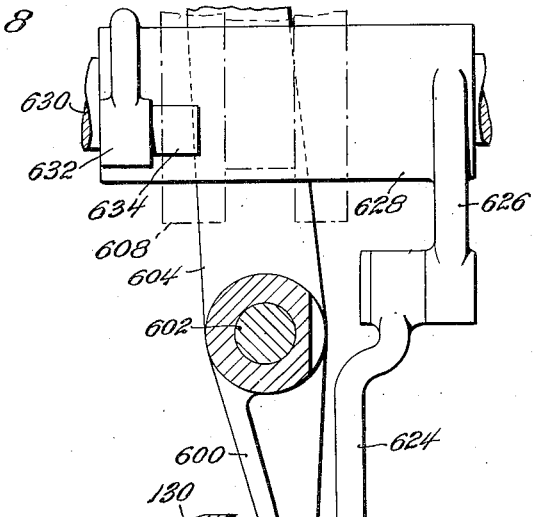
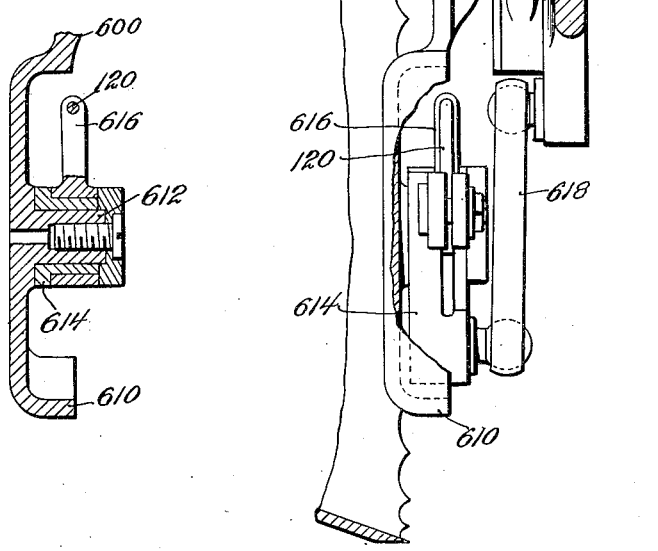
Witness
Jas J Maloney
Inventor
Alfred R. Morrill, Dec'd
Ruth W. Morrill, Adm'x
by her Attorney
Maxwell Fish

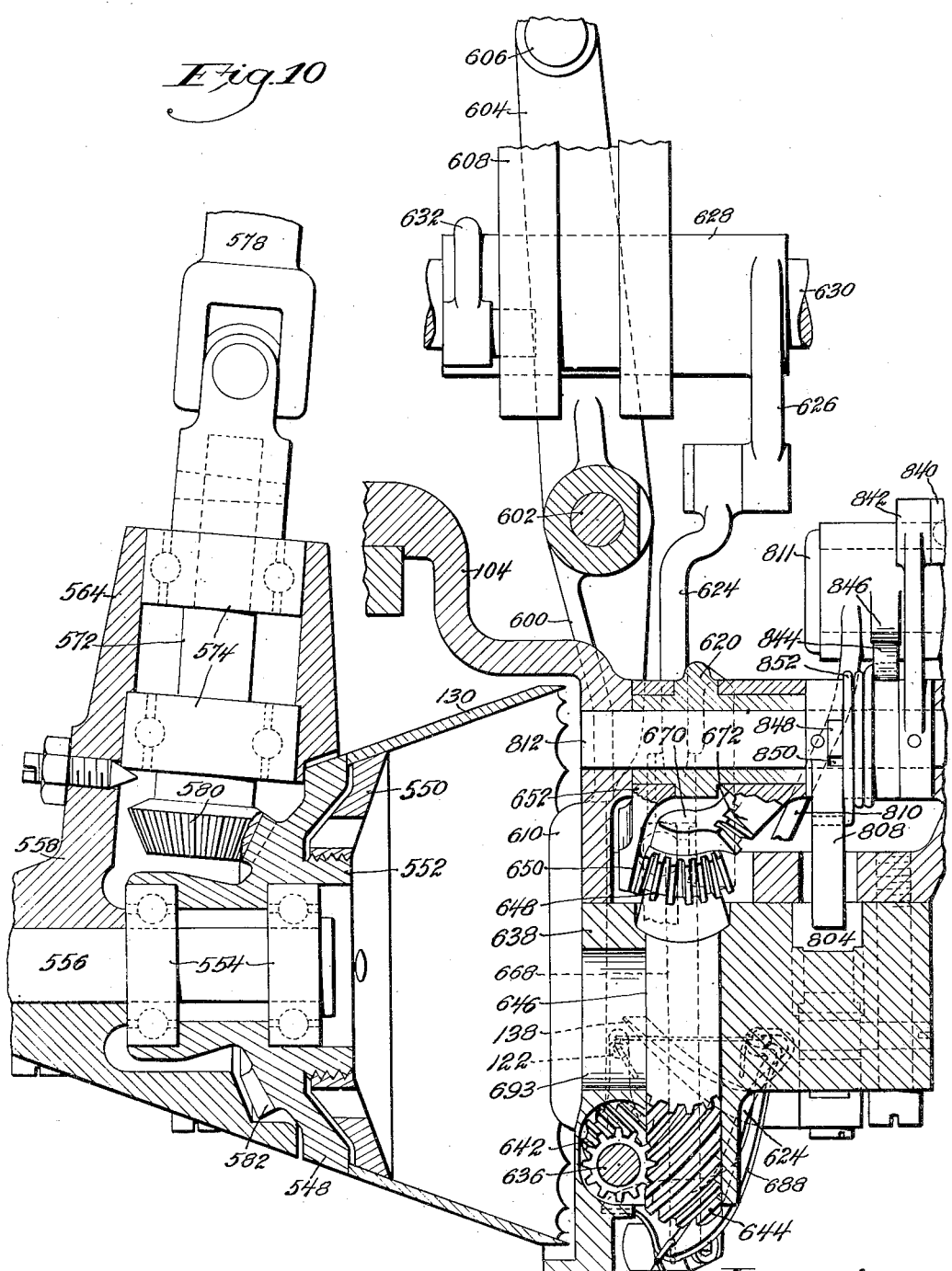

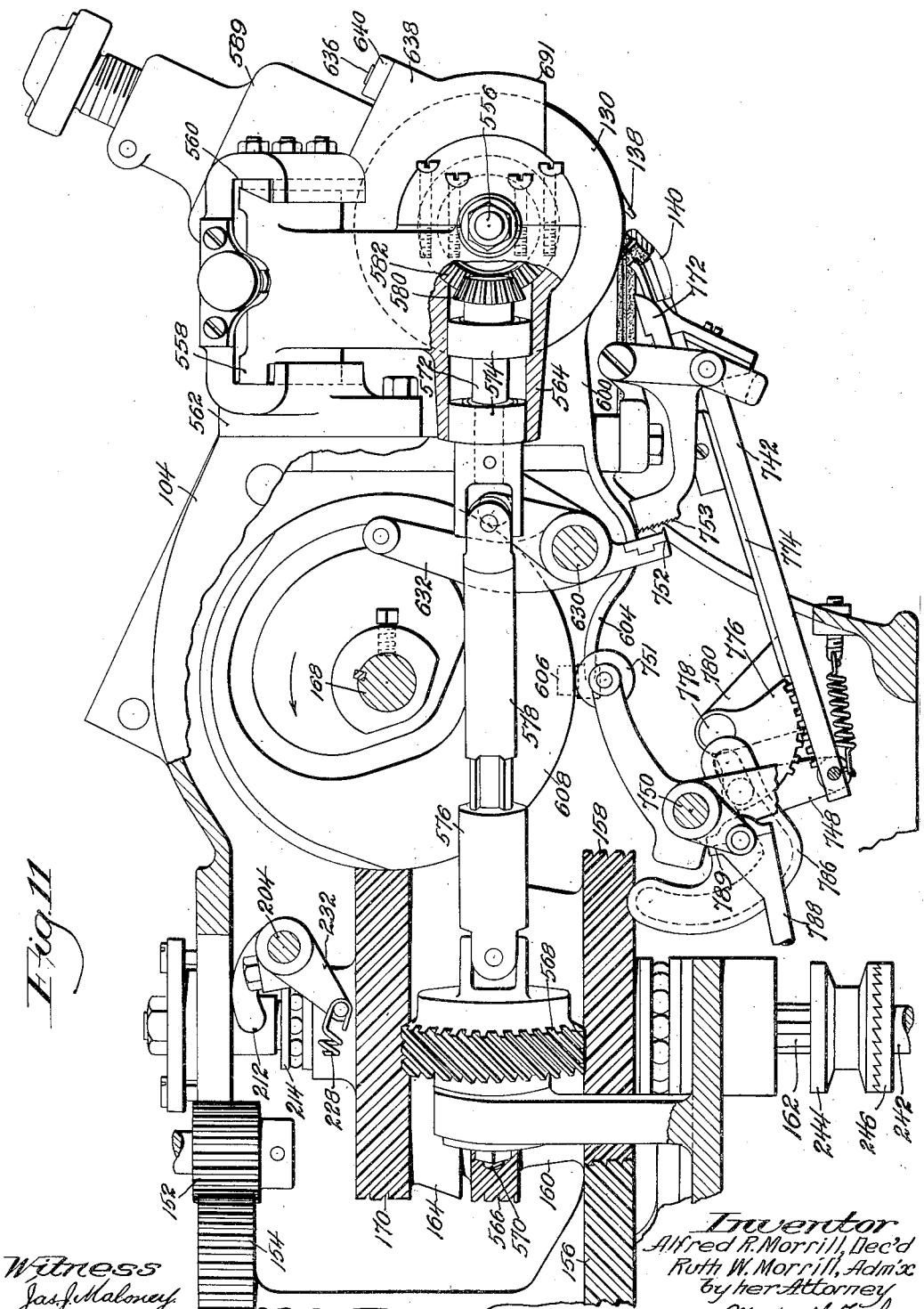

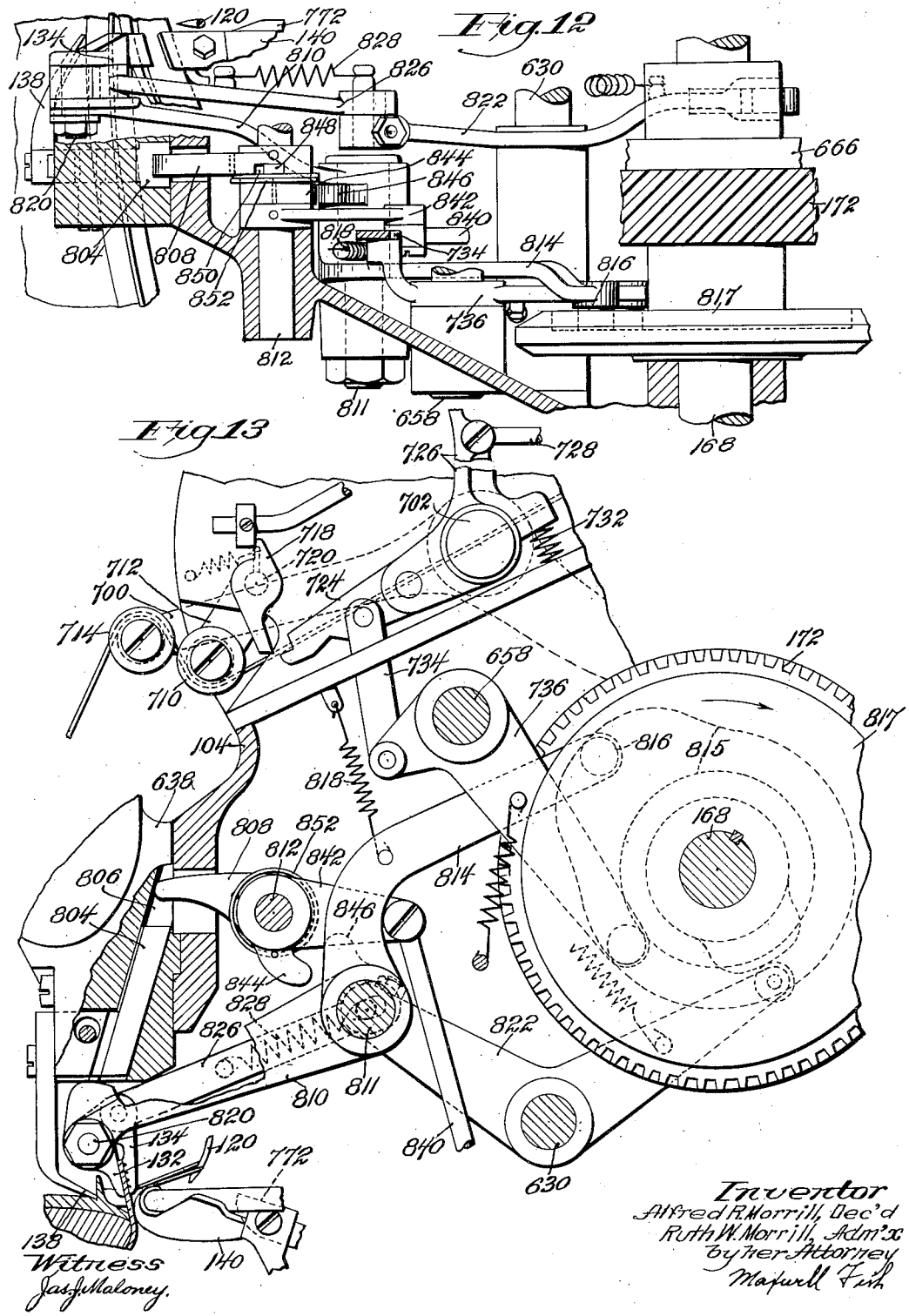

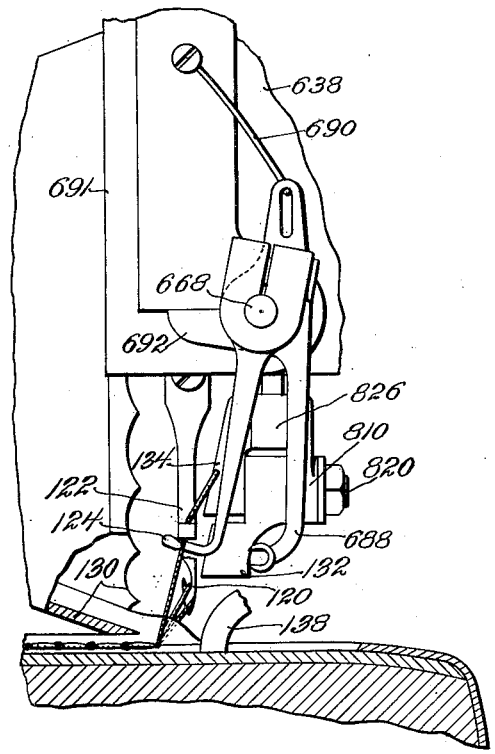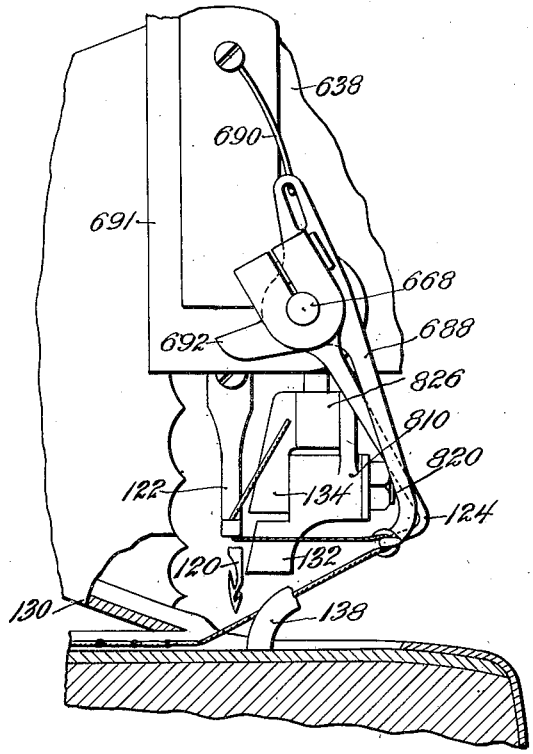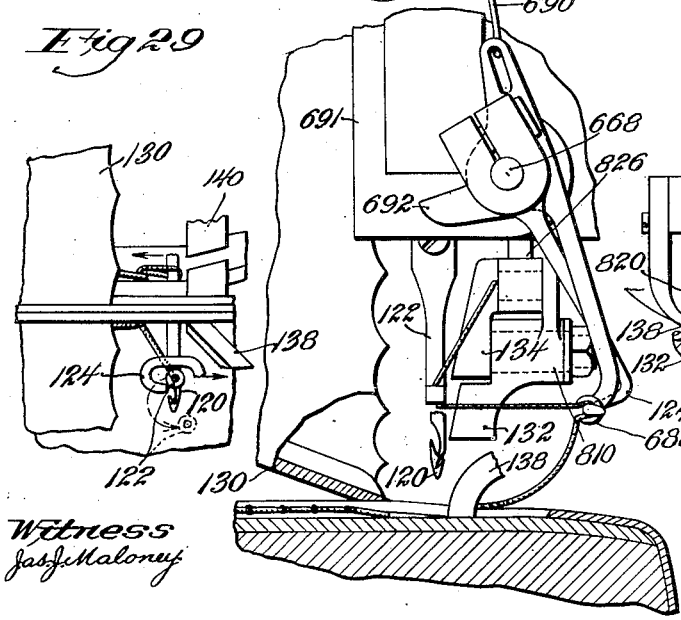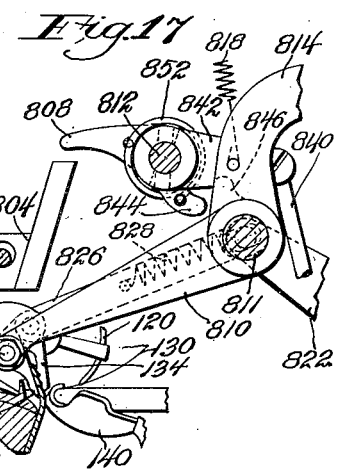

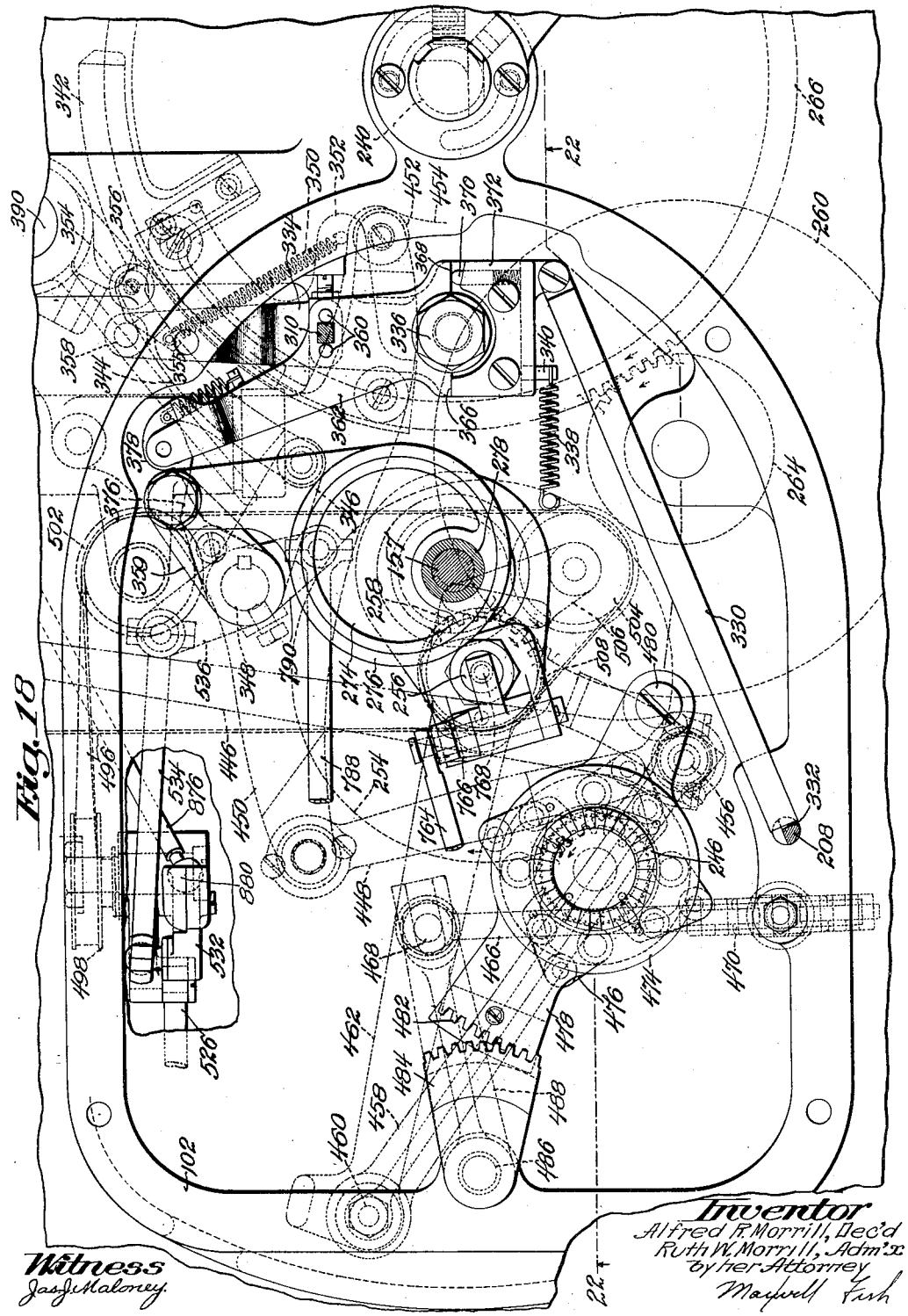

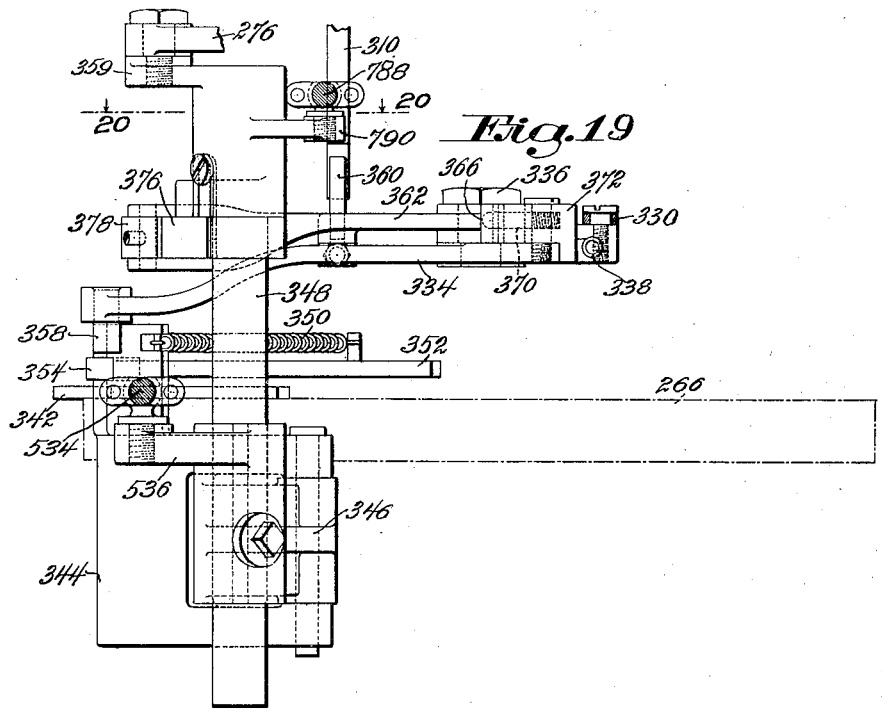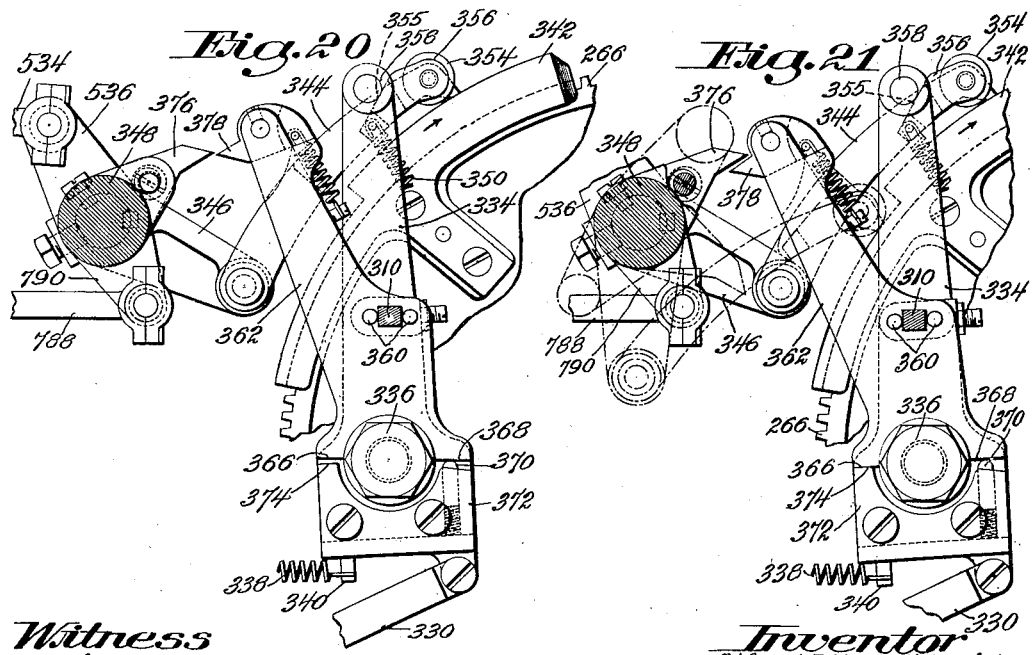

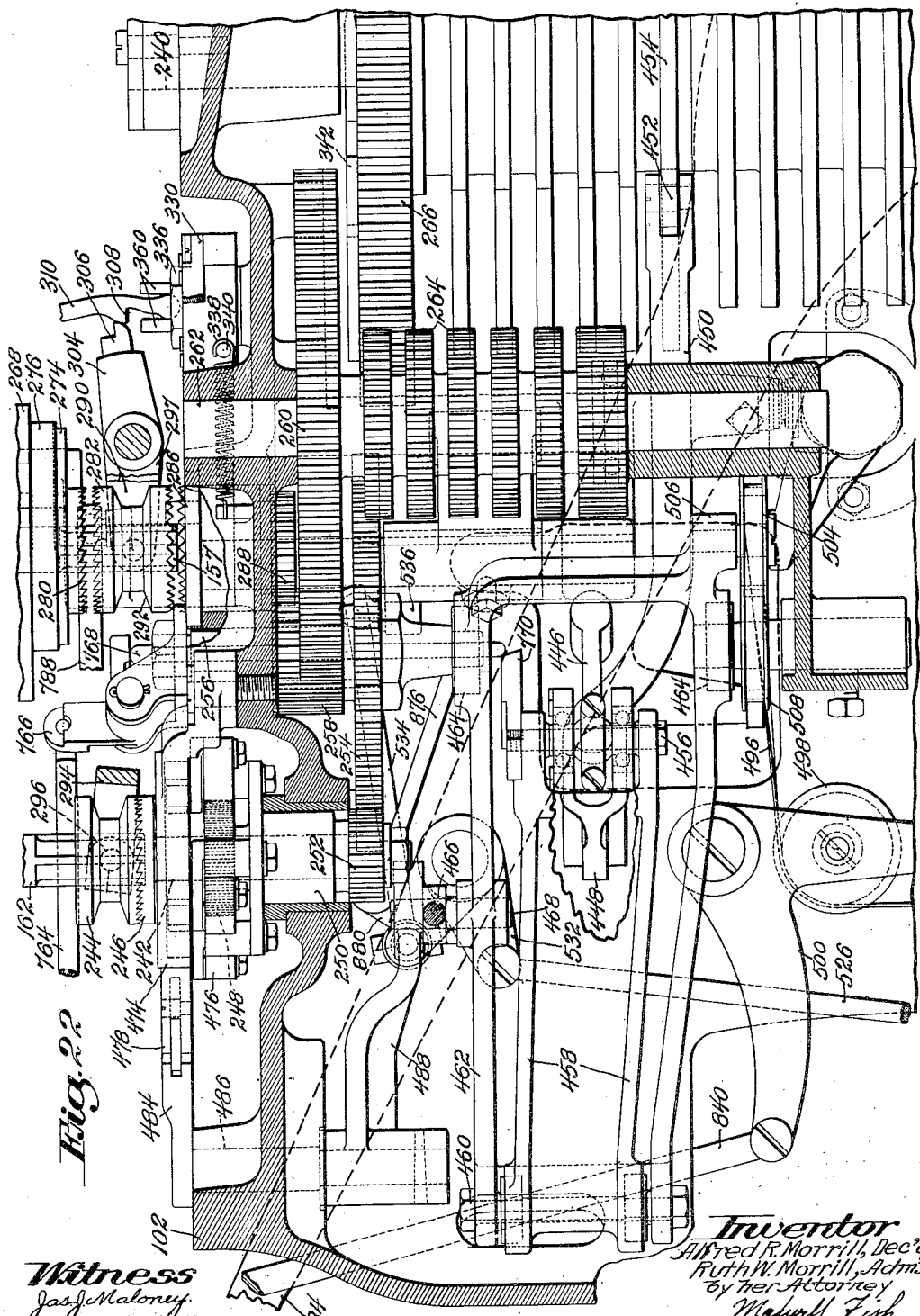

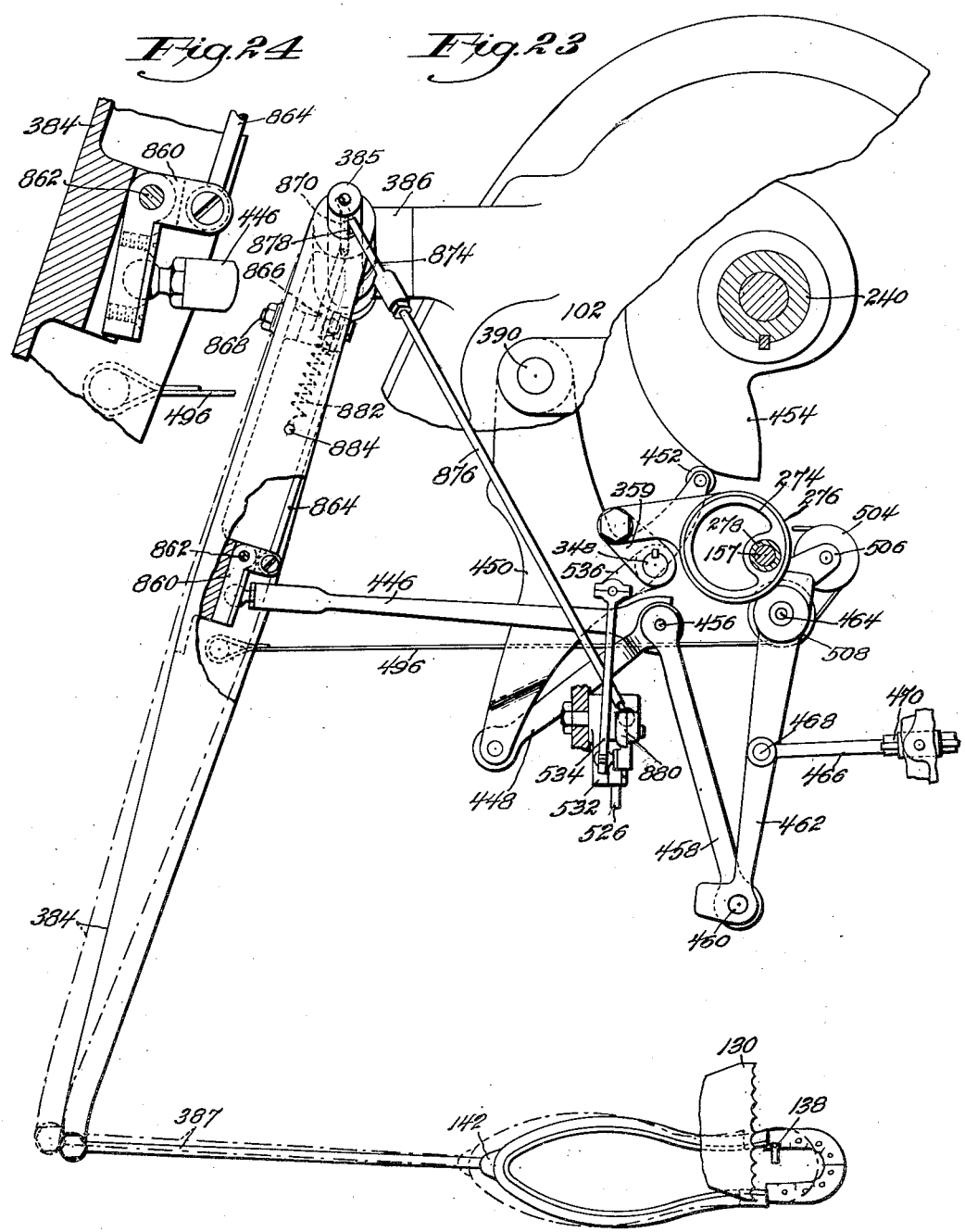

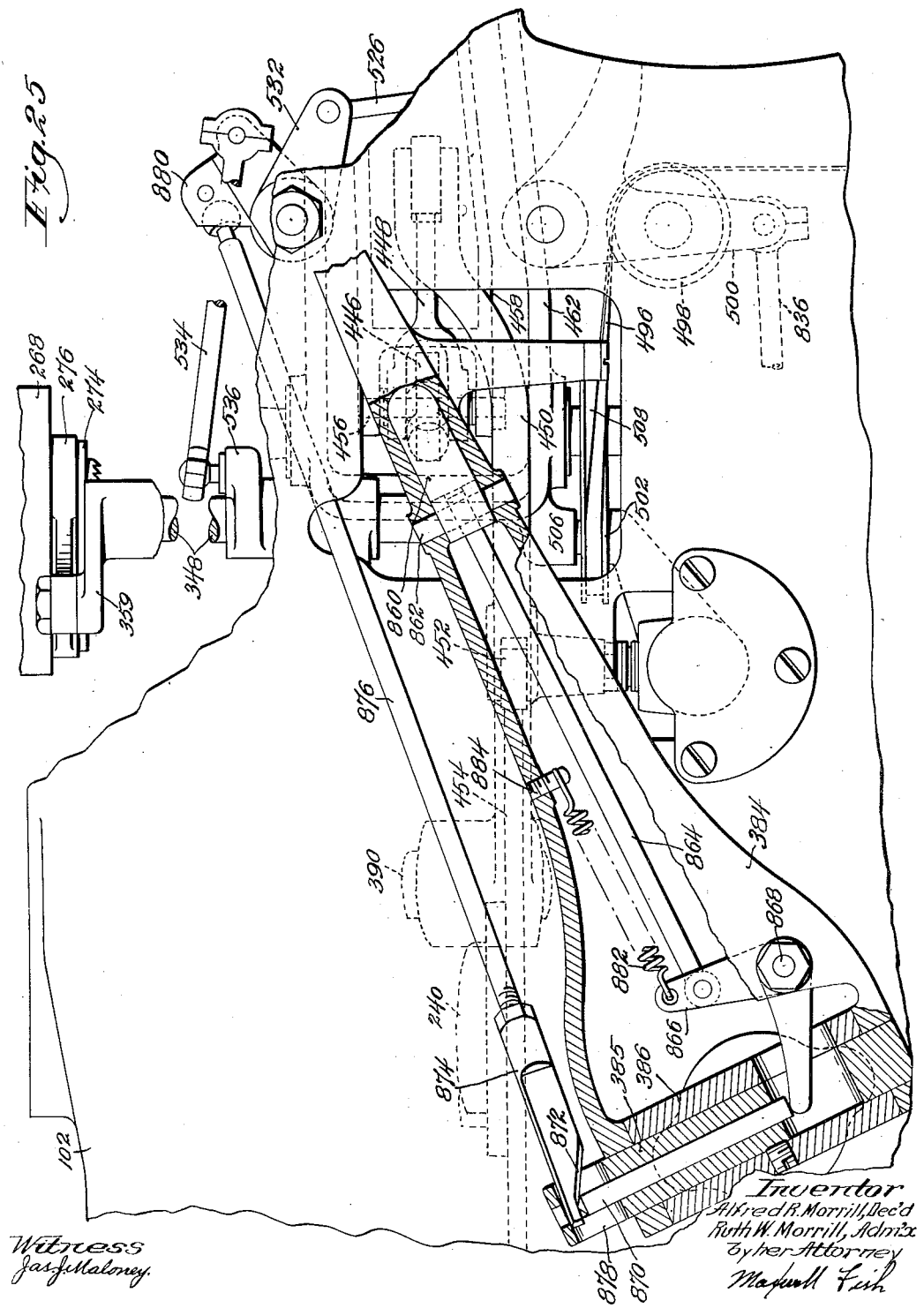

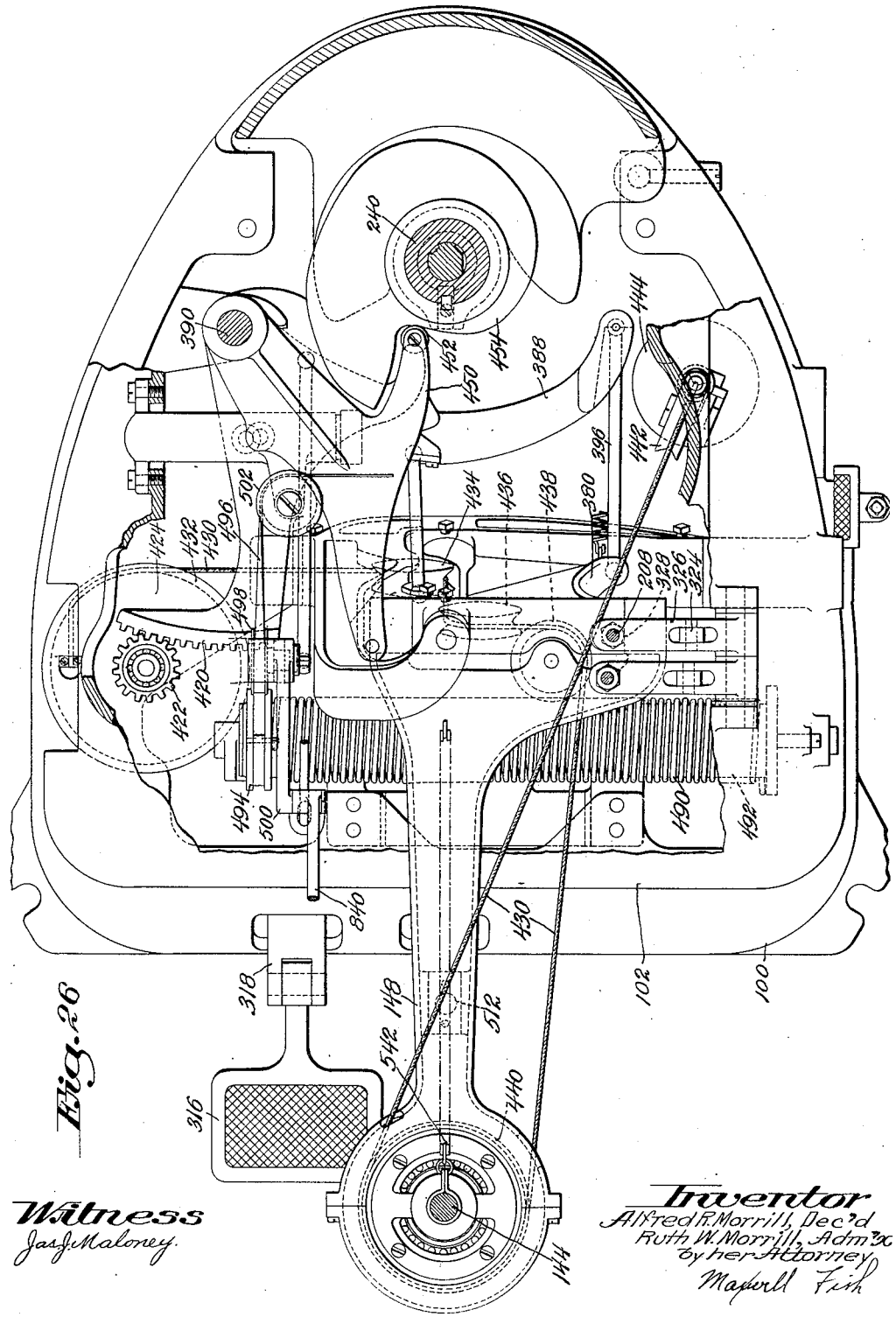

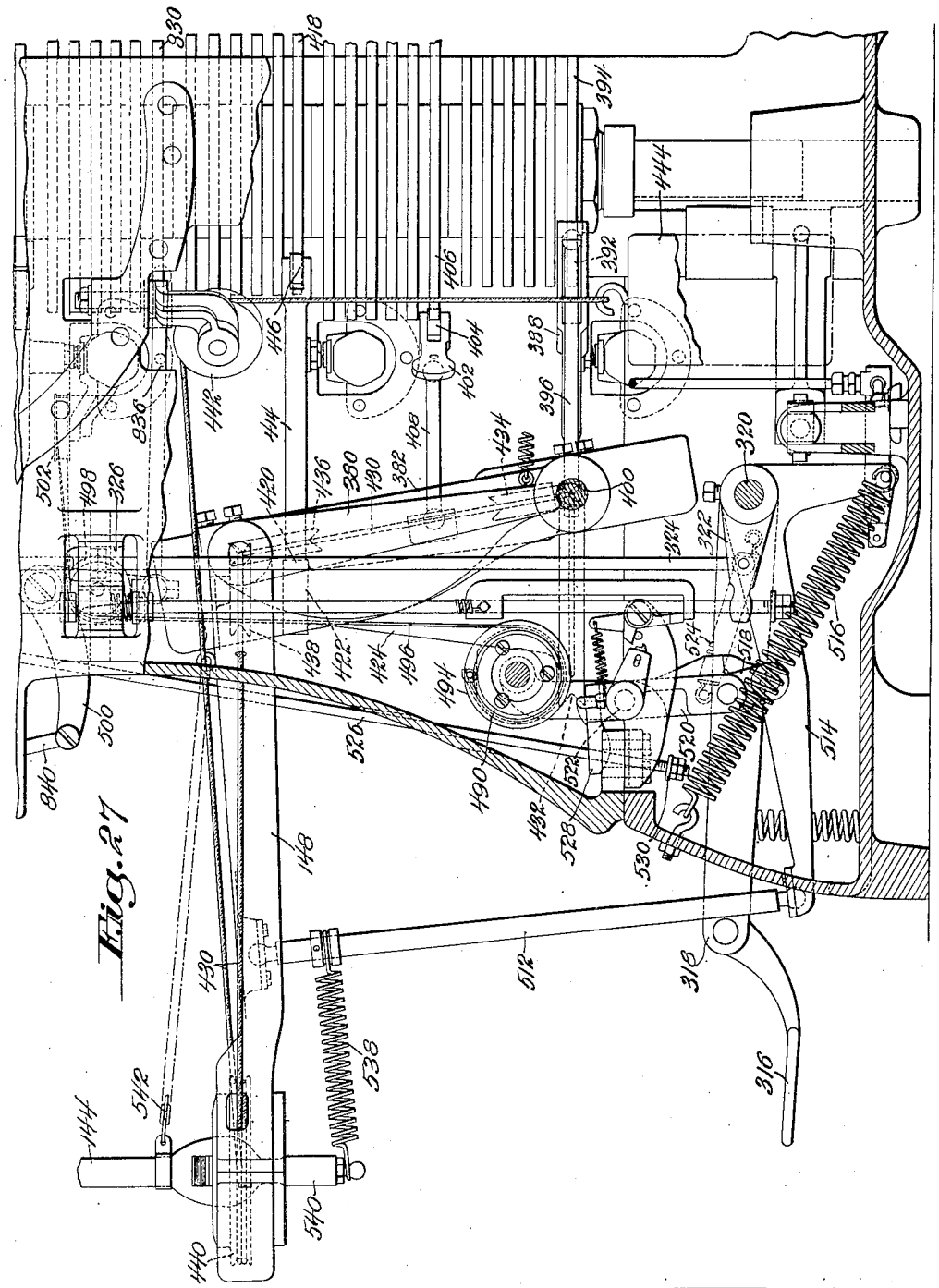

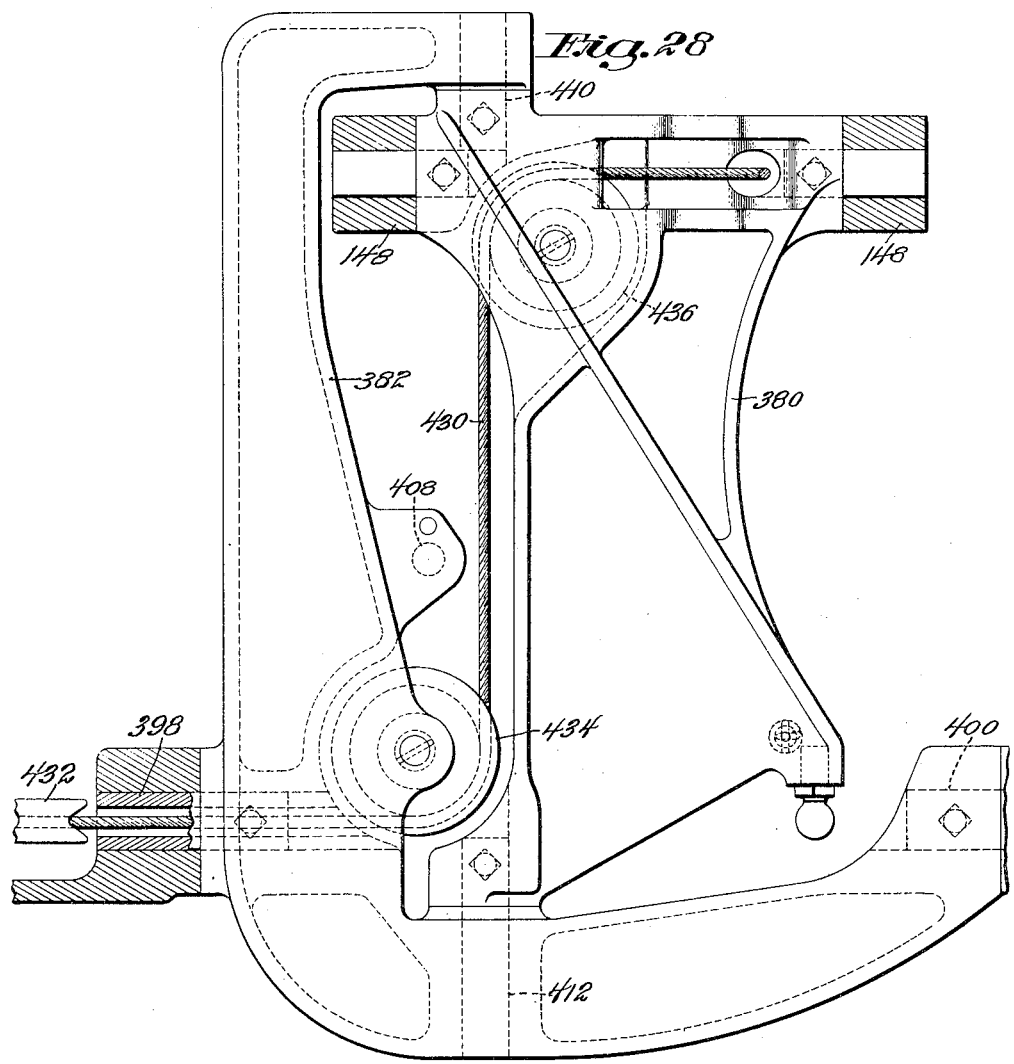

Patented Nov. 7, 1950

2,529,095

UNITED STATES PATENT OFFICE 2,529,095

SHOE MACHINE

Alfred R. Morrill, deceased, late of Woodstock, Vt., by Ruth W. Morrill, administratrix, Woodstock, Vt., assignor to United Shoe Machinery Corporation, Flemington, N. J., a corporation of New Jersey Application May 15, 1946, Serial No. 669,830

52 Claims. (Cl. 112—35)

The present invention relates to improvements in machines for operating about the sole margin of a shoe while supported on a last, and more particularly to a machine provided with a sewing mechanism for sewing together the upper and sole portions of a lasted shoe, and a trimming mechanism cooperating therewith for trimming the sewn seam. In a preferred form of the invention, a side lasting gripper is provided which acts in cooperation with the shoe sewing and trimming mechanisms of the machine to draw in and to position successive portions of the upper to be sewn together with the shoe sole.

The invention is shown as embodied in an automatic machine of the type in which the shoe is supported on a jack and in which the shoe operating means, which may include the shoe sewing, trimming and side lasting devices, and the jack are moved relatively to transfer the point of operation about the shoe and to change the relative position of the shoe and said operating means to cause the shoe to be presented properly to the operating means as the point of operation is transferred about the shoe, all of the relative movements of the shoe and said operating means being produced and controlled by automatically acting mechanisms.

While the several features of the present invention are particularly applicable to automatic shoe machines of the type above referred to, certain features of the invention are also capable of use in other types of automatic machines, or in machines in which the shoe is held in position by the operator. It is also to be understood that except as defined in the claims, the several features of the invention are not limited to any particular construction or arrangement of parts.

It is a principal object of the invention to provide a novel and improved shoe machine having mechanisms acting in sequence for sewing together the upper and sole portions of a lasted shoe and for trimming the sewn seam which are particularly constructed and arranged with respect to one another to permit the transfer of the operation about the shoe including the sharply curved toe thereof and with such turning and tipping movements as may be required for the proper placing of the stitches of the seam, and at the same time to insure the close and even trimming of the sewn seam in a single combined operation about the sole margin of the shoe.

It is a further object of the invention to provide a shoe machine having mechanisms for sewing together the upper and sole portions of a lasted shoe and for trimming the sewn seam which is further provided with a side lasting gripper and in which the side lasting, sewing and trimming operations are performed simultaneously during the transfer of the point of operation about the sole margin of the shoe.

It is another object of the invention to provide an automatic shoe machine of the general type having a shoe supporting jack and automatic supporting and actuating means for imparting relative feeding and positioning movements to the jacked shoe and to the operating means for transferring the operation about the sole margin of the shoe, of which the operating means comprise inseam sewing and inseam trimming mechanisms adapted to cooperate with the automatic support for the proper sewing and trimming of the inseam in a combined operation about the shoe.

It is still another object of the invention to provide an automatic machine of the general type referred to of which the operating means comprise inseam sewing and inseam trimming mechanisms in combination with a side lasting mechanism adapted for drawing in and for positioning successive portions of the upper for sewing, whereby said mechanisms are enabled to perform their respective operations simultaneously and in the proper order of sequence about the sole margin of the shoe.

With these and other objects in view as may hereinafter appear, a feature of the invention consists in the combination with a shoe sewing mechanism arranged for sewing together the upper and sole portions of a shoe, of a rotary tubular knife which is located with respect to the sewing mechanism to trim a portion of the seam held together by the completed stitches of the seam, the shoe being presented to and guided with relation to the sewing and trimming mechanisms for the simultaneous performance of these operations. In accordance with the invention, the sewing mechanism of the machine is arranged to operate in combination with a rotary tubular inseam trimming knife of the general type illustrated in the patent to Eppler No. 1,226,872, which does not require the use of a supporting anvil against the direct thrust of the cutter, and which is formed with a laterally extending relatively flat cutting edge of such extent as to permit substantial latitude of movement of the shoe about the point of operation without at the same time moving the portion of the inseam to be trimmed out of operative relation with the knife.

Another feature of the invention consists in the provision of a machine for operating about the sole margin of the shoe having in combination an inseam shoe sewing mechanism, a side lasting gripper and an inseam trimming knife so constructed and arranged with relation to one another to enable the shoe to be presented to and acted upon in the proper order of sequence by these mechanisms simultaneously as the point of operation is transferred about the shoe.

Another feature of the invention consists in the particular construction and arrangement of the sewing mechanism which will adapt such mechanism to be located in juxtaposition to the rapidly rotating edge of a knife of the general type herein disclosed, and includes the use of shielding surfaces to prevent any possibility of the thread being severed inadvertently by the knife.

Another feature of the invention consists in the provision of a thread gripper which forms part of the sewing mechanism, and which acts upon the completion of the seam to engage with and support a portion of the thread leading from the work in the path of movement of the trimming knife to sever the thread from the work.

Another feature of the invention consists in the construction and arrangement of the shoe operating devices including the shoe sewing and edge trimming mechanisms with relation to an automatic support or jack and associated supporting and actuating mechanisms to present the shoe to the operating mechanisms and to automatically transfer the sewing and trimming operations about the sole margin of the shoe while maintaining adjacent acted-upon portions of the sole edge portion of the shoe in a proper operating position with respect to both of said mechanisms.

Other features of the invention relate to the provision of devices for controlling the operation of the several cooperating mechanisms of the machine in accordance with an automatic cycle, whereby the operation of the sewing mechanism is stopped upon completion of the seam, and the feed of the shoe is thereafter continued to permit the completion of the trimming operation and the severing of the thread from the work.

The several features of the invention consist also in the devices, combinations and arrangement of parts, which together with the advantages to be obtained thereby will be readily understood by one skilled in the art from the following description taken in connection with the accompanying drawings, in which:

Fig. 6 is an enlarged detail view in front elevation of the machine head illustrating particularly the relation of the sewing instrumentalities and tubular inseam trimming cutter;

Fig. 7 is a sectional view in right side elevation of the operating head of the machine illustrating particularly the several sewing instrumentalities and the operating cam and follower connections therefor;

Fig. 8 is a fragmentary plan view of the needle supporting and actuating mechanism and of the tubular trimming cutter shown in right side elevation in Fig. 7;

Fig. 9 is a detail sectional view illustrating particularly the thread shield and pivotal support for the needle indicated in full lines in Fig. 8;

Fig. 10 is a sectional view on an enlarged scale illustrating particularly the supporting structure and operating connections for the rotary trimming cutter, thread finger and looper;

Fig. 11 is a somewhat fragmentary view in left side elevation of the operating head of the machine with portions of the casing broken away to show underlying parts;

Fig. 12 is a fragmentary plan view partly in section illustrating particularly the channel guide and side lasting gripper mechanism;

Fig. 13 is a view in right side elevation of substantially the parts shown in Fig. 12;

Figs. 14, 15 and 16 are somewhat diagrammatic views in front elevation illustrating three successive positions of the sewing instrumentalities upon stopping, and the trimming cutter and side lasting gripper in relation thereto to sever and cut the thread;

Fig. 17 is a fragmentary view in right side elevation of the sewing and side lasting devices illustrating the operation of the side lasting gripper to draw in a portion of the upper;

Fig. 18 is a sectional plan view of the machine taken through the upper portion of the base;

Figure 1:
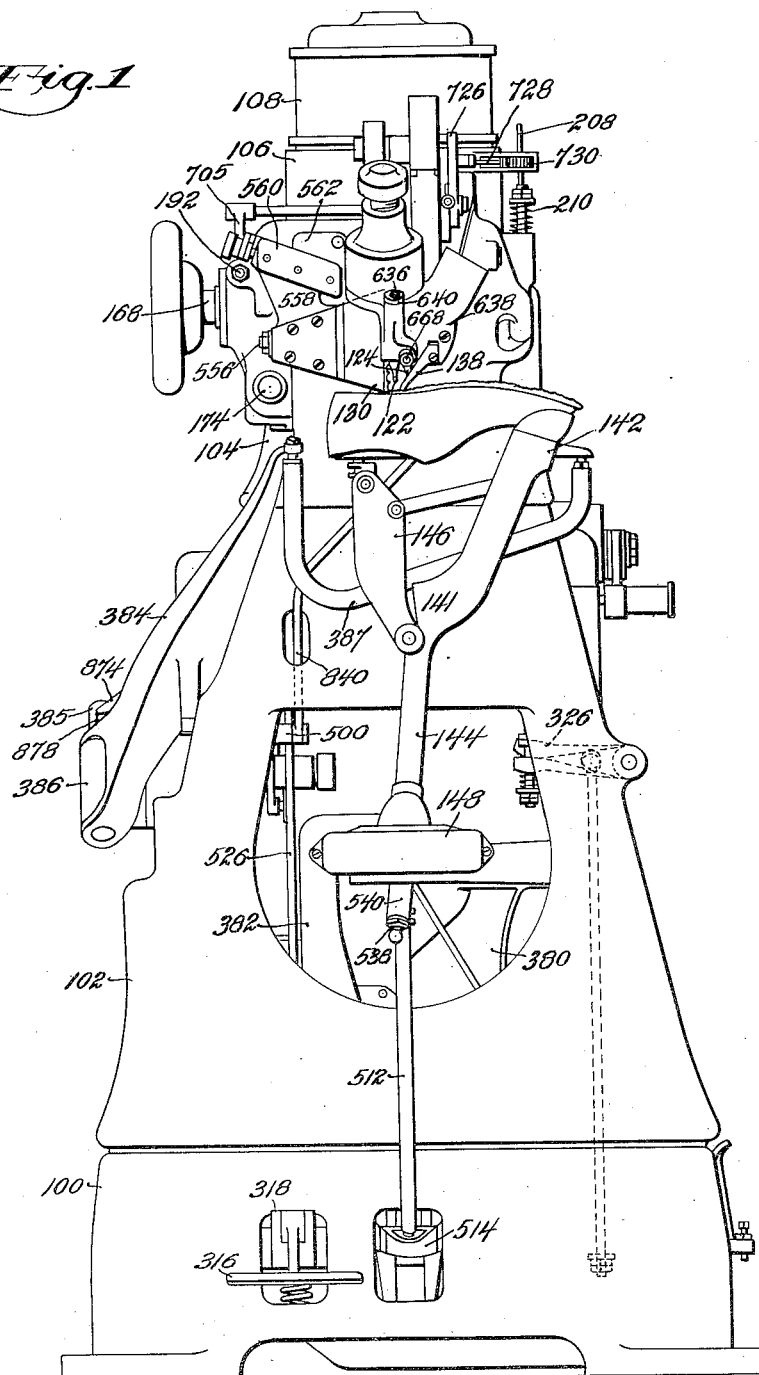
Fig. 1 is a view in front elevation of an automatic shoe machine embodying therein the several features of the invention.

Figs. 19, 20 and 21 are detail views of the eccentric mechanism employed to complete certain phases of the operation of the machine in sewing and trimming the inseam of a shoe, Figs. 19 and 20 showing the parts respectively in front elevation and in plan in the tripped position in which the stop mechanism of the machine is rendered operative, Fig. 20 being taken on section line 20—20 of Fig. 19, and Fig. 21 showing the parts in plan in position prior to the rocking and return movement of the eccentric control shaft which takes place after the stop mechanism has operated;

Fig. 22 is a view in right side elevation of the upper portion of the machine base taken on the line 22—22 of Fig. 18 with the casing broken away and sectioned to illustrate particularly the mechanisms shown in Fig. 18;

Fig. 23 is a fragmentary plan view showing particularly the feed lever and associated mechanism for imparting feeding movements to the jack;

Fig. 24 is an enlarged detail sectional view of the connection between the feed lever and the associated operating link shown in Fig. 23, but with the parts in the extended position taken at the completion of the added increment of feeding movement employed to finish trim the inseam;

Fig. 25 is a view in left side elevation of the parts shown in Fig. 23, but with a portion of the feed lever broken away and sectioned to illustrate particularly the mechanism for imparting an added increment of feeding movement to the jack to finish trim the inseam upon the completion of the operation about the shoe;

Fig. 26 is a sectional plan view taken through the base illustrating particularly the supporting and actuating devices for the jack;

Fig. 27 is a view in right side elevation of the base with the casing broken away and sectioned, illustrating substantially the parts shown in Fig. 26;

Fig. 28 is an enlarged detail view in front elevation illustrating particularly the system of supporting levers for the jack; and Fig. 29 is a fragmentary plan view of the inseam trimming knife and the inseam sewing and work guiding devices, the needle being shown through the work and with the thread finger and looper at the start of their needle threading motion.

The shoe machine illustrated in the drawings as embodying in a preferred form the several features of the invention, is an automatic machine adapted for performing simultaneously a plurality of related operations on the shoe as the point of operation is transferred about the sole margin of the shoe. The machine is provided with a shoe supporting jack and supporting and actuating mechanism for the jack adapted for imparting turning, tipping and feeding movements to the jacked shoe to present the shoe properly to the several operating instrumentalities grouped at or adjacent to the point of operation, and to transfer the operation of said instrumentalities about the shoe. The mechanism provided in accordance with a preferred form of the invention for operation on the shoe include an inseam shoe sewing mechanism adapted for sewing together the insole, upper and welt of the shoe supported on a last, a side lasting gripper adapted for drawing in successive portions of the upper for the operation of the sewing mechanism, and an inseam trimming knife which is arranged closely adjacent the sewing mechanism and acts to trim the sewn seam.

In order that the stitches of the inseam may be placed accurately across the base of the sewing rib when the shoe is sewn upon a conventional shoe sewing machine carried in a stationary sewing head, tipping and turning movements are imparted to the shoe following the irregular contours of the sole margin with reference to a supporting and guiding element on the machine in the form of a channel guide which engages the stitch receiving channel at the inner side of the sewing rib. This operation requires either a highly skilled operator or an automatic support which is constructed and arranged to follow with a high degree of precision the changes in contour during the transfer of the operation about the sole margin of the shoe. In the performance of an inseam trimming operation in which it is required to trim the sewing rib as closely as possible to the stitches of the inseam, a similarly accurate positioning of the shoe is required with reference to a point of support which in the usual inseam trimming machine is provided by a plurality of supporting and feeding rolls which engage the sewing rib and sole edge of the shoe. Heretofore it has been considered impracticable to combine the inseam sewing and inseam trimming operations, owing to the necessity for the accurate positioning of the shoe with respect to each of these mechanisms which are necessarily spaced from one another to cause the trimming cutter to operate only after the portion of the seam to be trimmed is given its final form by the tightening of the previously formed stitch. The necessity for providing a spacing between the sewing mechanism and trimming cutter of at least one completed stitch of the seam, presents a particularly difficult problem during the transfer of the operation about sharply contoured portions of the shoe sole as, for example, about the corner connecting the shank and ball portions of the sole, and about the toe.

A feature of the invention consists in the provision of a sewing mechanism and an inseam trimming mechanism which are located with relation to each other and with relation to a channel guide engaging the stitch receiving channel within the sewing rib in such a manner as to permit the shoe to be freely tipped and turned so that an accurate position of the shoe with relation to both the inseam sewing mechanism and trimming cutter is maintained during the transfer of the operation about the sole margin of the shoe.

In accordance with the invention, an inseam shoe sewing mechanism is provided in which all of the sewing instrumentalities are located and are arranged to operate at that side of the sewing point away from the completed stitches of the seam, and a rotary trimming knife of large diameter is employed in conjunction therewith having its axis of rotation parallel to the direction of feed and the knife edge passing transversely across the sewing rib at that side of the sewing point with the completed stitches of the seam. The shoe is located with relation to the inseam sewing mechanism and trimming knife by means of a channel guide which is located to support the shoe against the thrust of the needle, and to provide a point of support about which the shoe is tipped and turned for presenting the shoe to the sewing and trimming device during the transfer of the operation about the sole margin of the shoe.

Further in accordance with the invention, it is contemplated that a lasting gripper may be employed in combination with the inseam shoe sewing mechanism and associated inseam trimming knife here provided for drawing in successive portions of the upper to be stitched together with the insole and welt of the lasted shoe.

Further in accordance with the invention, the illustrated machine is provided with an automatic support comprising a shoe supporting jack and mechanism for imparting tipping, turning and feeding movements to the jack for the performance in a single automatic operation of the inseam sewing and inseam trimming operations upon the shoe.

Further in accordance with the invention, the machine of the present invention is provided with a driving and stopping mechanism which is constructed and arranged upon completion of the sewing operation, to stop the sewing mechanism with the needle withdrawn from the work, and thereafter to impart additional feeding and positioning movements to the shoe to cause the trimming knife to finish the trimming off of the sewn inseam.

Another feature of the invention consists in the construction and arrangement of the sewing and inseam trimming operations to cause the thread to be held at the completion of the seam, and the thread to be severed by the trimming cutter during the finish trimming operation thereof, and a subsequent manipulation of the shoe to cause the shoe to be moved away from the shoe sewing and trimming mechanisms, and thereafter returned to its initial starting position.

The automatic shoe machine illustrated in the drawings as embodying in a preferred form the several features of the invention, comprises generally a column-shaped support or casing which is made up of several sections including a floor section 100 housing principally the oil sump and various foot treadle controls of the machine, a middle section 102 housing principally the jack supporting mechanism and pattern mechanism of the machine, a head section 104 housing therein the welt sewing mechanism, the inseam trimming mechanism and side lasting gripper of the present invention, together with the driving and stopping mechanism of the machine, and a top section 106 supporting thereon the driving motor 108 and reduction driving gears therefrom connecting with the driving and stopping mechanism.

The operating devices of the machine include a chainstitch shoe sewing mechanism having a curved hook needle 120 movable in the line of feed, an oscillatory looper 122 and a thread finger 124 which is movable in a direction substantially parallel to the line of feed and away from the trimming knife of the machine, these parts being located entirely at that side of the sewing point away from the completed stitches of the seam to cooperate with a rotary tubular knife 130 which is of relatively large size with its axis parallel to the line of feed and with the cutting edge of the knife passing transversely across the sewn inseam.

The operating devices include also a side lasting gripper mechanism comprising a gripper member 132 supported to move downwardly between the last and upper, and a cooperating gripper member 134 pivoted to the gripper member 132 and arranged in cooperation therewith to engage and draw in successive portions of the shoe upper for the operation of the sewing mechanism. The side lasting gripper is constructed and arranged to engage with and draw in a portion of the upper which extends between the last and the welt guide with the latter in its retracted position in order to draw in particularly that portion of the upper at the sewing point.

The jacked shoe is guided in position with relation to the several operating devices during the transfer of the operation about the sole margin of the shoe by means of a channel guide 138 which is arranged to ride in a stitch receiving channel and support the shoe against the needle, and the cooperating welt guide designated at 140 which yieldingly engages against and is periodically locked against the outer edge of the shoe.

In the illustrated machine, the shoe supported on a last is mounted on the shoe supporting jack which may be of well known construction as that, for example, illustrated in the patent to Cross No. 2,056,714, dated October 6, 1936. The jack indicated generally by the reference character 141 comprises a toe supporting arm 142 rigid with a spindle 144 and a heel supporting arm 146 pivoted at its lower end on the upper end of the spindle 144. The jack is carried on a forwardly extending arm 148 forming part of the automatic supporting and actuating mechanism for the jacked shoe hereinafter again referred to in connection with the description of the automatic shoe support provided with the present machine.

Figure 2:
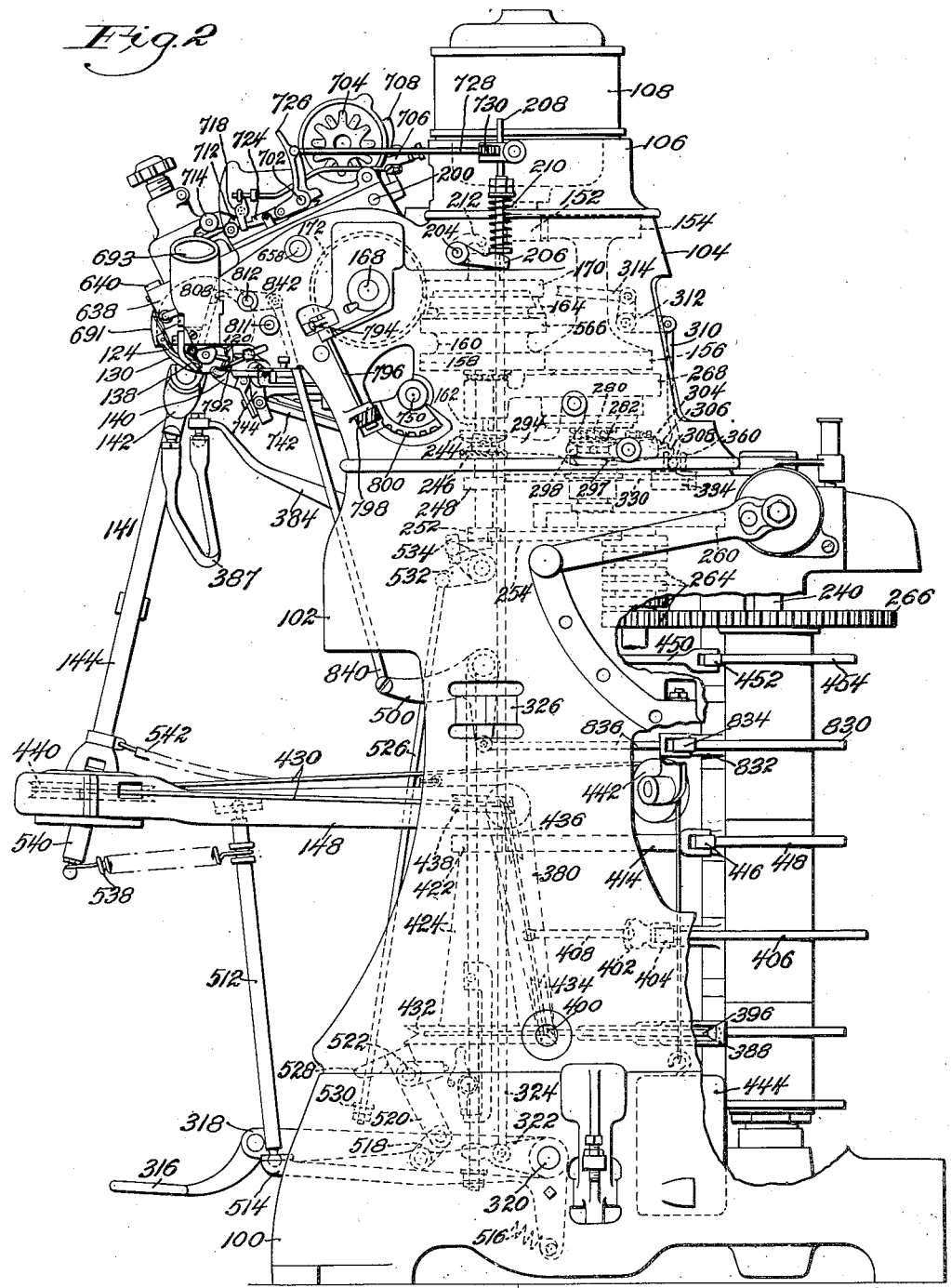
Fig. 2 is a view in right side elevation of the shoe machine illustrated in Fig. 1, portions of the casing being broken away to illustrate particularly the pattern cams of the machine.
Figure 3:
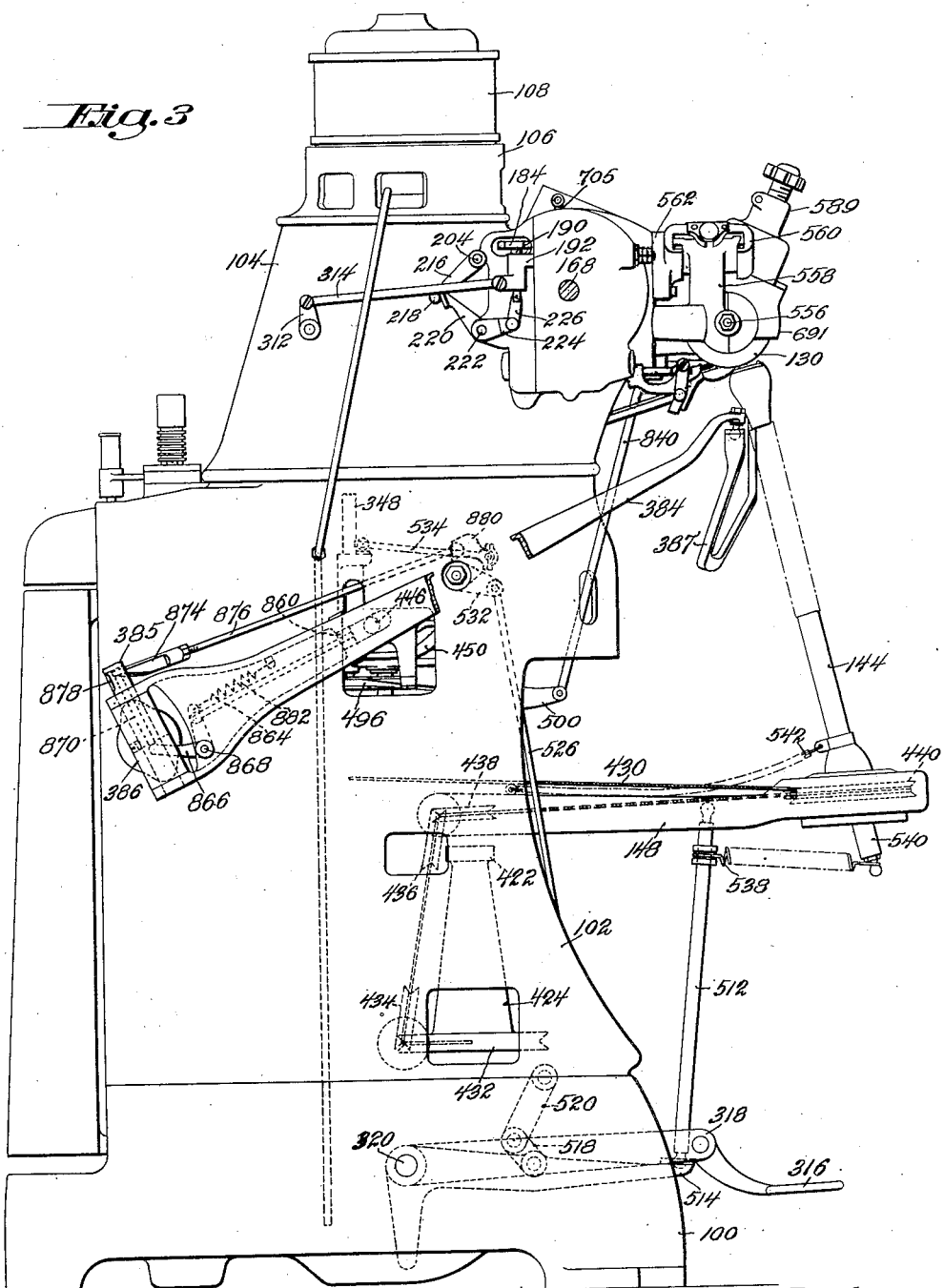
Fig. 3 is a view in left side elevation of the machine shown in Figs. 1 and 2.
Figure 4:
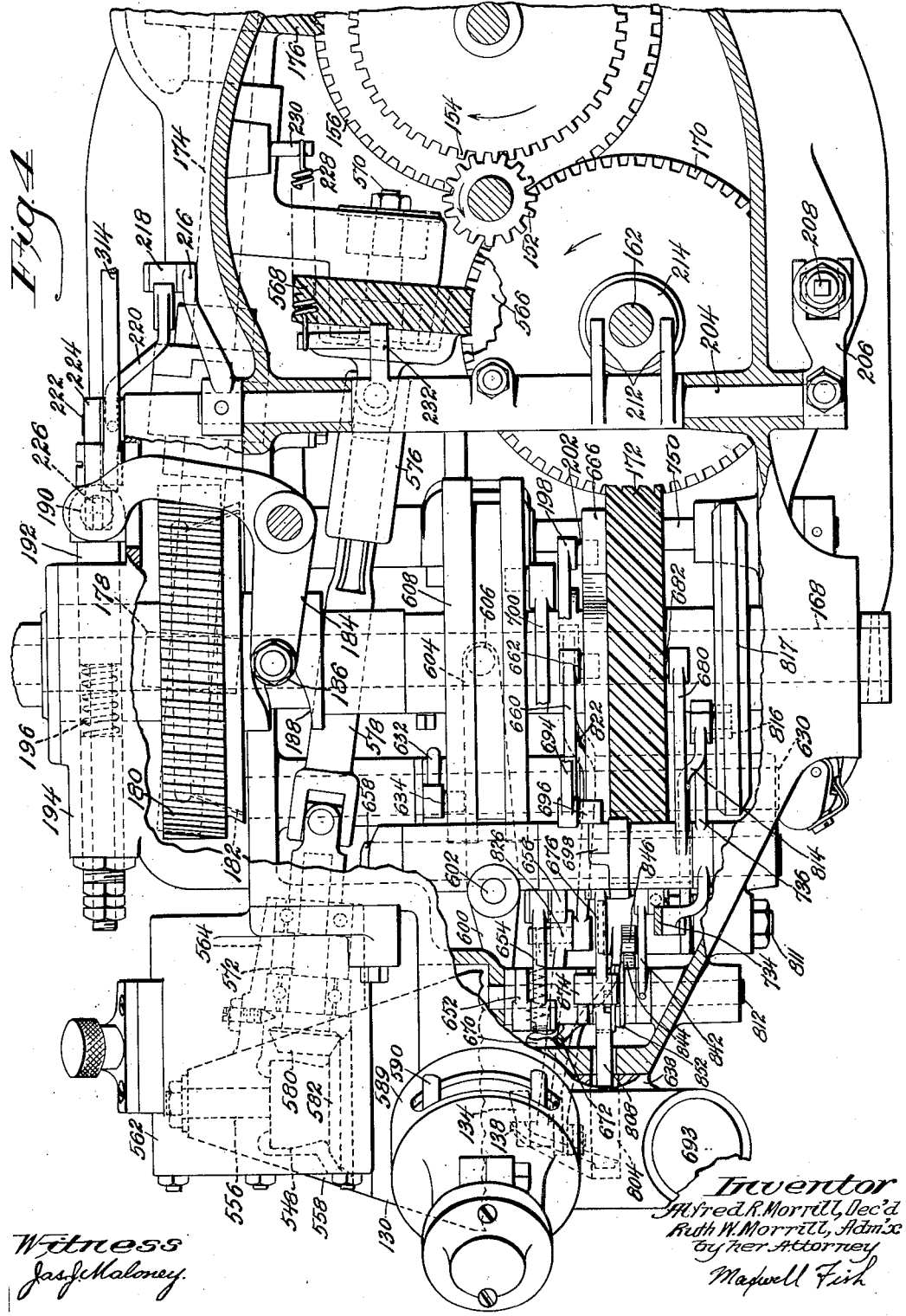
Fig. 4 is a plan view of the machine head with a portion of the machine casing broken away and partly in section to illustrate particularly portions of the sewing mechanism including the sewing cam shaft, the sewing machine driving and stopping mechanism and the driving connections for the rotary inseam trimming cutter.
Figure 5:
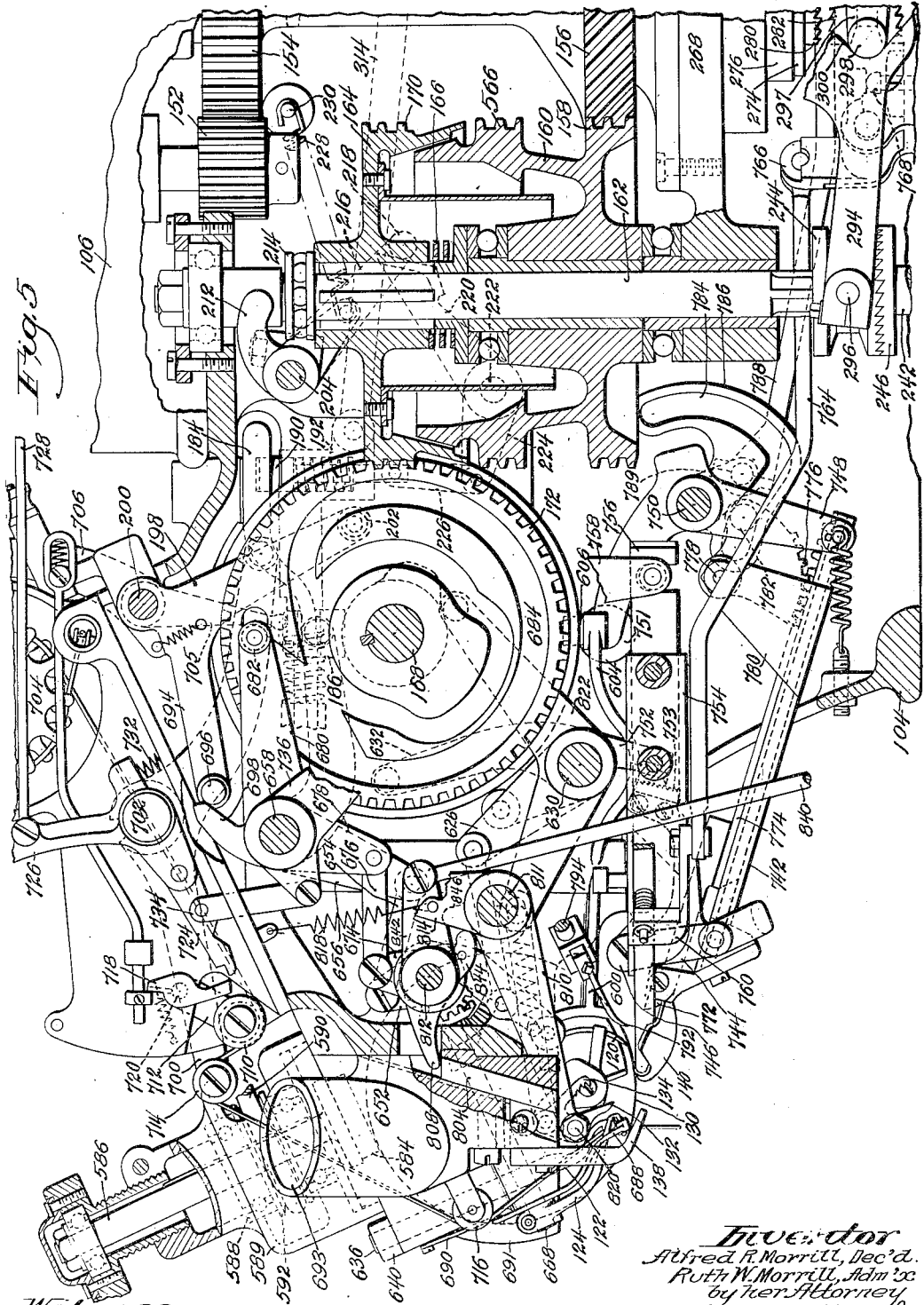
Fig. 5 is a sectional view in right side elevation illustrating in general the parts shown in Fig. 4.

The driving and stopping mechanism of the machine, as best shown in Figs. 2, 4 and 5 of the drawings, comprises the electric motor 108, the armature of which carries a gear 152 which meshes with a gear 154 carried on a sleeve element together with a second gear 156, so that the two gears turn as a unit. The eccentric drive shaft of the machine indicated at 157 (see Figs. 2 and 18) is mounted directly beneath the gears 154, 156 and is connected to be driven therefrom by means of a planetary transmission. The gear 156 meshes with a gear 158 formed integrally with an external coned clutch member 160 which is mounted between end thrust ball bearings on a vertical shaft 162 and forms the driving element of the main driving clutch of the machine. These parts are driven continuously.

The cooperating driven element of the main driving and stopping clutch comprises an internal coned clutch member 164 keyed to turn with and to slide on the drive shaft. A compression spring 166 interposed between the driving and driven elements of the clutch tends normally to move the driven clutch member 164 upwardly to disengage the clutch. The driven member 164 of the main starting and stopping clutch is arranged through its splined connection with the vertical drive shaft 162 to drive the pattern mechanism of the machine including the pattern cam shaft. The driven clutch member is also connected to drive the sewing cam shaft of the machine designated at 168 through the meshing engagement of a spiral gear 170 formed on the outer periphery of the driven clutch member 164 with a spiral gear 172 secured to the sewing cam shaft 168.

In stopping the machine, the sewing cam shaft is first brought to a gradual stop in a predetermined angular position and then is driven through a predetermined distance in a reverse direction to a predetermined angular stop position by means of slow speed reverse driving connections and a friction clutch mechanism on the sewing cam shaft. The sewing cam shaft stopping and reversing clutch mechanism is arranged to be thrown into operation as the main clutch 164 is disengaged in stopping the machine. This mechanism is substantially similar to that illustrated and described in applicant's prior Patent No. 2,359,664, but will be briefly described as follows:

The reverse driving connections referred to, as best shown in Figs. 4 and 5, comprise a forwardly extending reverse drive shaft 174 which is continuously driven from the gear 156 through the engagement therewith of a spiral gear 176 on shaft 174. A worm 178 on the shaft 174 meshes with a worm gear 180 on the sewing cam shaft 168. The reverse gear 180 is arranged through cone friction clutch surfaces to drive a member 182 which is keyed to the sewing cam shaft 168 and forms a driven element of the sewing cam shaft reversing and stopping clutch. The position of the reversing clutch is controlled by means of a bell-crank clutch shifting lever 184 which carries on one arm thereof a roller 186 engaging a cam track 188 in the sleeve hub of the driven clutch member 162. During normal operation in which the clutch is disengaged, the bell-crank lever 184 has an idling motion determined by the contours of the cam track 188. At the same time that the main clutch 164 is disengaged in stopping the machine, the vertically arranged lock bolt 190 carried in the rearwardly extending end of a lock bolt carrier or slide 192 is permitted to engage within a socket formed in the free end of the bell-crank 184. The slide 192 is supported in a casing 194 and is acted upon by a compression spring 196 coiled about a reduced portion of the slide which tends to maintain the same in a fully extended rearward position. During continued rotation of the sewing cam shaft and clutch member 182, the position of the bell-crank shifting lever 184 is controlled by its connection with the lock bolt 190 and lock bolt carrier 192 so that the roller 186 riding in the cam track 188 acts to engage the clutch member 182 with the reverse driving clutch gear 180 acting to frictionally stop and thereafter to drive the sewing cam shaft 168 in a reverse direction, to a predetermined angular stop position in which the clutch member 182 is again moved to inoperative position. During this operation of stopping and reversing the sewing cam shaft, the clutch and control bell-crank lever 184 and slide 192 will be moved forwardly against the pressure of spring 196 and then rearwardly to the final stop position shown, for example, in Fig. 4.

As in the construction illustrated in the Morrill patent above referred to, mechanism is provided for stopping the cam shaft in a predetermined stopped position. This mechanism consists of a stop arm 198 which is loosely supported at its upper end on a pivot 200 and is provided at its lower end with a roller 202. During reverse movement of the sewing cam shaft in stopping the machine, the stop lever 198 and roller 202 are arranged to move inwardly into a stop cam groove (not shown) which acts as the roller 202 reaches the bottom of the groove to bring the cam shaft 168 to a positive stop.

The mechanism for controlling the operation of the main stopping and starting clutch 164, as best shown in Figs. 2, 4 and 5, comprises a rock shaft 204 extending transversely of the machine and provided at its right hand end with a forked lever arm 206 (see Fig. 2) which straddles a vertically extending treadle rod 208 and engages beneath a compression spring 210 coiled about the treadle rod 208. The spring 210 is seated at its upper end against a collar fixed to the treadle rod. A forked clutch control lever 212 rigidly secured to the rock shaft 204 is arranged to bear against a thrust bearing 214 seated against the upper end of the sleeve hub of the main starting and stopping clutch member 164, and is rendered operative by a downward movement of the treadle rod to engage the main clutch. For controlling the operation of the lock bolt 190, there is also secured to the rock shaft 204 a downwardly and rearwardly extending lever arm 216 which carries a roller 218 adapted for engagement against a cam surface formed on a lever arm 220 secured to a rock shaft 222 parallel to and beneath the rock shaft 204. At its left-hand end, the rock shaft 222 carries a lever arm 224 which is connected by a link 226 to the lower end of the lock bolt 190. The lock bolt 190 is forced upwardly by means of a spring.

A tension spring 228 connected at one end to a fixed pin 230 and at its other end to a pin on a depending lever arm 232 on the rock shaft 204 tends to rock the shaft 204 in a direction to maintain the forked clutch control lever 212 in its relatively raised inoperative position. During normal operation of the machine, in which the treadle rod 208 is in its depressed position and in which the rock shaft 204 has been rocked in a clockwise direction against the pressure of spring 228, the lever arm 216 will occupy a relatively depressed position in which the roller 218 bearing against the cam surface of the lever 220 supports the lock bolt in a depressed inoperative position. When the treadle rod is released and permitted to move upwardly in stopping the machine, the corresponding upward movement of the lever arm 216 and roller 218 permits the lever arm 220 to move rearwardly under the influence of its spring to raise the lock bolt into position in which it will engage within the recess formed in the free end of the arm of the clutch controlled bell-crank lever 184 to engage the sewing cam shaft reversing and stopping clutch 182.

The pattern shaft of the machine generally designated at 240 is driven from the main starting and stopping clutch through connections which include the clutch member 164 and vertical driving shaft 162, a secondary clutch, a variable speed mechanism and a reduction gear train which may be of ordinary description. As best shown in Figs. 2, 5 and 22, the drive shaft 162 is connected at its lower end through a ratchet toothed clutch to drive a stud shaft 242 in axial alignment therewith. The secondary clutch referred to comprises a driven clutch element 244 keyed to turn and to slide axially upon the drive shaft 162 for engagement with a cooperating clutch member 246 fast on the shaft 242 to which is secured a driving ratchet 248 (see Fig. 22) forming part of the variable speed driving mechanism for the pattern cam shaft 240. Since this variable speed driving mechanism is well known in the art, no specific description of it is believed necessary. The driven element of the variable speed mechanism comprises a downwardly extending sleeve member 250 which is connected by reduction gearing best shown in Fig. 22 to drive the pattern shaft 240 and includes a gear 252 formed in the lower end of the sleeve 250, and a gear 254 meshing therewith carried on a stud shaft 256. Thence the drive is taken through a gear 258 on the stud shaft 256 which meshes with a gear 260 on a vertical drive shaft 262. Also mounted on the shaft 262 are a number of driving gears 264 which mesh with a gear 266 on the pattern shaft 240 in any of its vertically adjusted positions.

The drive for the one revolution eccentric which is employed in stopping the machine to perform a number of auxiliary operations, and the reverse drive for the pattern cam shaft 240 are taken from the lower end of the vertical drive shaft 157 which as above noted is continuously driven from the sleeve unit including gears 154, 156 and a planetary gear train carried in a housing 268. An eccentric cam 274 fitted with an eccentric strap 276 is loosely sleeved to turn on a bushing support 278 for the shaft 157 and is provided with ratchet-shaped clutch teeth 280 for engagement with an eccentric and reverse driving clutch member 282 which is keyed to turn with and to slide axially upon the shaft 157. Upward movement of the eccentric clutch member 282 to the engaging position with clutch teeth 280 causes the eccentric 274 to be driven from the drive shaft 157. For driving the pattern cam shaft in a reverse direction, the clutch member 282 is arranged to be moved downwardly into engagement with a ratchet-toothed clutch element 286 having formed integrally therewith a pattern shaft reverse driving gear 288 which meshes with the gear 258 forming part of the driving gear train for the pattern cam shaft 240.

The mechanism for controlling the positions of the eccentric and reverse driving clutch member 282 and of the pattern cam shaft secondary clutch 244 is similar to that shown in the inventor's prior Patent No. 2,359,662, including a forked clutch shifting lever 290 having rollers which engage in an annular groove 292 in the eccentric clutch member 282. A second clutch shifting lever 294 carries rollers 296 which engage in an annular groove in the clutch member 244.

Under normal operating conditions of the machine, the position of the clutch shifting lever 294 and pattern cam shaft secondary clutch 244 are determined in accordance with the position of the eccentric clutch shifting lever 290 by means of an actuating connection from the sleeve hub of the lever 290 which comprises a forwardly extending lever arm 297 formed on the sleeve hub and provided at its forward end with a laterally extending roller 298 which engages in a V-shaped notch 300 formed in a downward extension of the auxiliary clutch shifting lever 294. The relationship of the V-shaped notch 300 and the roller 298 is such that the pattern cam shift secondary clutch 244 will be automatically located in the desired open or closed position corresponding to each of a number of predetermined angular positions of the sleeve hub of the shifting lever 290 and eccentric clutch member 282 controlled thereby. For the rest position of the machine shown in Fig. 2, and also while the machine is in operation, the eccentric clutch lever 290 will occupy the position shown in which the eccentric clutch lever 290 and the clutch member 282 are located in an intermediate neutral position, and the roller 298 is located in the bottom of the V-shaped notch 300, and the secondary clutch shift lever 294 controlled thereby is in its fully depressed position and with the secondary clutch 244 engaged.

In stopping the machine, the clutch lever 290 is rocked to cause the eccentric clutch member 282 to engage with and positively drive the eccentric through one revolution, while at the same time the roller 298 moves outwardly from the center of the notch 300, forcing the clutch shift lever 294 upwardly to disengage the secondary pattern cam shaft clutch 244. This operation is effected by means of a rearwardly extending arm 304 which controls the position of the eccentric clutch lever 290, and supports the notched detent member 306 for engagement with a corresponding notch 308 in a vertically movable clutch control rod 310. At its upper end the control rod 310 is pivotally connected to one arm of a bellcrank 312, the other arm of which is connected by a link 314 with the lock bolt carrier 192. In stopping the machine, the lock bolt carrier 192 as above pointed out, is moved forwardly and then rearwardly, imparting to the control rod 310 a corresponding upward and downward movement which is operative to engage the notch 308 with the detent 306, and thereby to depress the detent 306 and lever 304 to engage the eccentric clutch. At the end of one revolution of the eccentric, the lower end of the control rod 310 is moved rearwardly to release the detent 306 as hereinafter more fully described, permitting the clutch mechanism to again return to the position shown in Fig. 22, in which the eccentric clutch is in an intermediate neutral position and the secondary pattern shaft clutch 244 is engaged.

The starting of the machine, as previously pointed out, is effected by a downward movement of the treadle rod 208 which rocks the shaft 204 to engage the main clutch 164 and to withdraw the lock bolt 190. This movement is effected through actuating connections including a foot treadle 316 carried on the forward end of a treadle lever 318 in the machine base (Figs. 2, 26, 27). The treadle lever 318 is secured at its rear end to a transversely extending rock shaft 320 which also carries a forwardly extending lever arm 322 to which is pivoted the lower end of a vertically extending connecting rod 324. At its upper end the connecting rod 324 is pivotally secured to a laterally extending lever arm 326 (Figs. 26 and 27) having the outer end thereof journalled to receive the lower end of the treadle rod 208. A collared nut 328 at the lower end of the treadle rod 208 is arranged to bear against the under side of the lever arm 326, so that downward movement of the lever 326 with the foot treadle 316 will act to depress the treadle rod 208. The treadle rod is then held in its depressed operating position by the engagement of the forward end of a latch bar 330 with a notch 332 in the treadle rod 208 (Fig. 18).

The machine is stopped automatically upon the completion of the sewing operation about the margin of the shoe sole, by means of mechanism forming part of the stop motion of the machine which acts to withdraw the latch bar 330 from engagement with the notch 332 in the treadle rod 208, and thereby permits the opening of the main clutch 164 and the release of the lock bolt 190 for operatively connecting the sewing cam shaft clutch shifting lever 184 with the lock bolt carrier 192. As best shown in Figs. 18 to 21 inclusive, the latch bar 330 is pivotally connected at its rear end with a treadle rod release lever 334 which extends laterally of the machine, and is loosely mounted to turn on a vertically extending pivot shaft 336. A tension spring 338 connected at one end to a pin 340 on the treadle rod release lever 334 and at its other end to a point on the machine frame, tends to move the lever 334 in a direction to engage the latch bar 330 with the notch 332 in the treadle rod 208.

The mechanism for automatically throwing the stop motion into operation is actuated directly from the pattern cam shaft 240 after it has made nearly a complete revolution. To secure this result, a block 342 (see Figs. 18 to 21 inclusive) is secured to the upper surface of the gear 266 at the upper end of the pattern cam shaft, which block after the pattern cam shaft has made nearly a complete revolution, engages with a wide-faced pawl 344 pivoted to a laterally extending arm 346 of a vertically disposed eccentric rock shaft 348, and moves said pawl outwardly from the gear 266 against the pressure of a tension spring 350 connected between the pawl 344 and a horizontally disposed plate 352 forming part of the machine frame. A roller 354 mounted on the upper edge of the pawl 344 is arranged for engagement with the edge of the fixed plate 352 to limit the movement of the pawl toward the gear 266 under the influence of spring 350. The outward movement of the pawl causes a cam surface 355 formed on a fixed projection 356 of the pawl 344 to engage with a cam roll 358 on the treadle release lever 334, moving the treadle release lever positively in a counterclockwise direction to withdraw the latch bar 330 from engagement with the treadle rod 208. The main clutch 164 is now permitted to open, and the lock bolt 190 is released, operatively connecting the sewing cam shaft shifting lever 184 with the lock bolt carrier 192. As previously pointed out, the subsequent forward and back motion imparted to the lock bolt carrier 192 is employed to impart an upward and downward movement to the eccentric clutch control rod 310 (see Figs. 2 and 22) to engage the eccentric clutch 282 with the eccentric 274 which is now driven through one revolution to impart a clockwise followed by a counterclockwise rocking movement to the eccentric rock shaft 348. In order to effect this movement, the eccentric strap 276 is (see Figs. 18 and 22) provided with a lateral extension which is pivotally connected to a lever arm 350 secured to the upper end of the eccentric rock shaft 348.

In order that the vertical reciprocating movement of the eccentric clutch control rod 310 may be rendered operative to engage the clutch, and also to provide means for subsequently disconnecting the eccentric drive after one revolution of the eccentric 274, the eccentric clutch control rod 310 is connected at its lower end to be swung forwardly and rearwardly about its pivotal connection with the bell-crank lever 312. As best shown in Figs. 2 and 18, the lower end of the eccentric control rod 310 is slidably engaged between two vertically extending pins 360 on a laterally extending eccentric control lever 362. The lever 362 is supported to turn on the fixed pivot 336 directly above the treadle release lever 334, and is connected to have only a limited movement with relation thereto. To this end the eccentric control lever 362 has formed on opposite sides of the hub portion thereof, shouldered portions 366, 368, the shouldered portion 368 being engaged by a spring-pressed plunger 370 carried in a block 372 secured to the upper side of the treadle release lever 334 which serves to maintain the shouldered portion 366 in yielding engagement with an abutting shoulder 374 on the block 372. During the rocking movement of the treadle release lever 334 to its release position, the associated eccentric control lever 362 is biased also in a forward direction by the action of the spring-pressed plunger 370, so that during the subsequent upward movement of the eccentric control rod 310, this rod will be swung forwardly to engage the notch 308 with the notched portion 306 of the rearwardly extending arm 304 forming part of the eccentric clutch shifting lever.

With the present construction, connections are provided which are rendered operative by the rocking movements imparted to the eccentric rock shaft 348 to shift the eccentric control lever 362 rearwardly against the pressure of the plunger 370, and thereby to disengage the eccentric clutch 282 at the completion of one full revolution of the eccentric. The connections for effecting the disengagement of the eccentric drive comprise a short lever arm 376 on the eccentric rock shaft 348 which during the clockwise rotational movement of the eccentric rock shaft engages with but passes a yieldingly supported detent 378 on the eccentric control lever 362, and thereafter on its return movement in a counterclockwise direction as the eccentric completes one full revolution, positively engages the detent, thereby shifting the eccentric control lever 362 rearwardly, thus disengaging the eccentric control rod from the clutch shifting lever, and permitting the eccentric clutch 282 to return to its intermediate neutral position.

The rocking movement of the eccentric rock shaft 348 has for one of its functions to complete the rotation of the pattern cam shaft. During the clockwise movement of the eccentric rock shaft 348, the pawl 344 is withdrawn to a position in which the pawl rides off of the rear end of the block 342, and the fixed projection 356 is positioned behind the same, as shown in dot-and-dash lines in Fig. 21. During the subsequent counterclockwise rotation of the eccentric rock shaft, the pawl 344 is rendered operative to continue the rotation of the pattern cam shaft to its initial starting position.

The shoe supporting jack comprising the toe support 142, heel support 146 and spindle 144 are mounted for turning, tipping and feeding movements on a lever supporting assembly (see Figs. 26, 27 and 28) which includes the forwardly extending arm 148, a pitch support lever 380 on which the arm 148 is mounted to swing vertically, and a roll support lever or frame 382 pivotally mounted at its lower end in the machine base so as to be capable of swinging about a horizontal axis, and upon which the support lever 380 is mounted so as to swing about a substantially vertical axis. These parts are so arranged as to permit free rotational movement of the jack and its supporting spindle 144 on its gimbal joint, and for imparting forward and back or roll tipping movements and longitudinal or pitch tipping movements to the jack to properly position the shoe with relation to the shoe operating devices including the inseam sewing mechanism, the side lasting gripper and the inseam trimming knife, as the point of operation is transferred about the shoe.

Feeding movements are imparted to the shoe by means of a feed lever 384 (see Figs. 1, 3, 23 and 25) located on the left side of the machine outside of the machine casing, and pivotally supported at its rear end for lateral swinging movements on a cross pin 385 on a lateral rock shaft 386 journalled in a bearing at the rear of the machine. At its forward end the feed lever 384 is connected by means of a curved link 387 with the toe support 142 of the jack.

Longitudinal pitch tipping movements are imparted to the jack by means of a pitch cam lever 388 (see Figs. 2, 26, 27 and 28) supported adjacent the lower end of pivot shaft 390 and having intermediate its length an offset portion forked to receive a cam roller 392 for engagement with a cooperating pitch cam 394 on the pattern cam shaft. The pitch cam lever is connected by a forwardly extending link 396 to a lateral extension of the support 380, the connection between the link 396 and the support 380 being located substantially on the line of centers of the pivot bearings 398, 400 of the frame 382.

Forward and back or roll tipping movements are imparted to the jack by means of a roll cam lever 402 (see Figs. 26, 27 and 28) supported on the pivot shaft 390 above the pitch cam lever 388, and having a roller 404 which engages with a cooperating roll cam 406 on the pattern cam shaft 240. The roll cam lever 402 is connected by a link 408 to an intermediate portion of the frame 382, this connection being located substantially on a vertical line of centers of the bearings 410, 412 for the support 380 in the frame 382. As best shown in Fig. 28, the roll support lever 382 takes the form roughly of an L within which the pitch support lever 380 is mounted to turn. The axis of rotation of the pitch support lever 380 intersects the axis of rotation of the roll support lever 382, and has its lower bearing 412 located substantially beneath the rotational axis of the roll support lever 382.

The mechanism for imparting turning movements to the jack comprises a turn cam lever 414 supported on the pivot shaft 390 above the roll cam lever 402, and provided with a roller 416 arranged to engage with a cooperating turn cam 418. A forward extension of the turn cam lever 414 has formed thereon a gear segment 420 which meshes with a pinion 422 (see Fig. 26)

carried on the upper end of a cone-shaped pulley member 424. Rotational movement is imparted to the jack from the pulley member 424 by means of a cord 430 which is secured at one end to a pulley 432 formed on the lower end of the member 424, and thence passes around an idler pulley 434 on the frame 382, an idler pulley 436 on the support 380, an idler pulley 438 on the jack supporting arm 148, and around a wheel 440 supported to turn with the jack spindle 144. Thence the cord extends rearwardly over an idler pulley 442 and downwardly to a weight 444, which serves to maintain an adequate tension on the cord.

The mechanism for actuating the feed lever 384 of the machine, for imparting feeding movements to the jack, for adjusting this mechanism is accordance with the size of shoe being operated upon, for positioning the variable speed mechanism through which the pattern cam shaft is driven, and for locking these parts in their adjusted position, while similar to corresponding mechanism shown in the Morrill patent No. 2,359,662 above referred to, will be briefly described in connection with Figs. 18, 22, 23 and 24 of the drawings. Feeding movements are imparted to the feed lever 384 by means of a link 446 connected with a second link 448 which is in turn connected to the forward extension of a feed cam lever 450 supported on the pivot shaft 390. A feed cam roller 452 on the lever 450 engages a feed cam 454 on the pattern cam shaft of the machine. Links 446 and 448 are arranged at an acute angle with relation to one another, being pivotally connected together by a pivot pin 456, and to the free end of a double link 458 which serves as a guiding link for the pivotal connection 456 of the links 446, 448. The link 458 is fulcrumed at 460 on a fulcrum carrying frame lever 462 mounted to turn on an axis 464. Motion is transmitted from the feed cam lever 450 through links 448 and 446 to the feed lever 384, the extent of this motion being determined in accordance with the direction of movement imparted to the pivotal connection 456 of the guiding link 458. The fulcrum carrying frame lever 462 is held in locked and adjusted position during the operation on the shoe by mechanism comprising a laterally extending rod 466 connected at one end by means of a connecting pin 468 to the fulcrum carrying frame lever 462, and at its other end arranged to be engaged by a locking device indicated generally in dotted lines at 470 in Fig. 18. During operation on the shoe the locking device is operative to support the fulcrum carrying frame lever 462 in locked position. The placing of a new shoe on the jack acts to release the locking device 470 so that the fulcrum carrying frame lever 462 is unlocked and adjustment of the mechanism for actuating the feed lever can be made by movement of the jack to starting position. The fulcrum carrying frame lever is locked in position on starting the machine through connections controlled from the starting treadle.

The position of adjustment of the fulcrum carrying frame lever 462 serves also to determine the adjustment of the variable speed pattern shaft driving mechanism of the machine. This mechanism as generally indicated in Fig. 18, includes an eccentric ring 474 which controls the positions of a series of driving ratchets 476 through which the variable speed drive is taken, and is carried on the under side of a control lever 478 mounted to turn on a stationary pivot 480. The control lever 478 is provided at its outer end with gear teeth 482 which mesh with teeth formed in a gear segment 484 secured to a vertically disposed variable speed control rock shaft 486. The position of the rock shaft 486 is determined by means of an arm 488 secured thereto, which at its outer end is provided with a slotted portion engaging the upper end of the connecting pin 468 on the fulcrum carrying frame lever 462. In accordance with the disclosure of the Morrill patent referred to, a yieldably acting device is provided for exerting a force on the fulcrum carrying frame lever 462, and on the feed connections generally tending to move the fulcrum carrying frame lever 462 toward one limit of its adjustment, and to keep the feed cam lever 450 in engagement with its cam. The means employed comprises a long coil torsion spring 490 carried on the base portion of the machine and connected at one end to a relatively stationary drum element 492 and at its other end to a freely rotatable pulley 494. A metal strap 496 anchored at one end on the pulley 494 extends upwardly around a pulley 498 on a bell-crank lever 500, then rearwardly around a fixedly supported idler pulley 502. Thence the strap 496 extends laterally around a pulley 504 carried on a rearward extension 506 of the fulcrum carrying frame lever 462 and around a wheel 508 carried on a fixed pivot, and then laterally to the feed lever 384 to which it is anchored.

The jacked shoe is forced yieldingly upwardly into operating position with relation to the shoe sewing mechanism during the operation about the shoe, and is then moved positively downwardly out of engagement therewith in stopping the machine, by mechanism which comprises a vertically extending jack supporting rod 512 (see Figs 1, 2, 3, 26 and 27) connected at its upper end by means of a universal joint with the under side of the jack supporting arm 148, and at its lower end by means of another universal joint to the forwardly extending arm of a bell-crank lever 514 which is loosely supported to turn on the pivot shaft 320. A pair of heavy tension springs 516 connected at one end to the downwardly extending fork arms of the bell-crank 514 and at their other ends to the machine frame, tend to move the lever 514 and supporting rod 512 upwardly to maintain the jacked shoe yieldingly in engagement with the sewing mechanism.

The mechanism for controlling the operation of the jack includes a toggle mechanism which is arranged to be moved to a straightened position in stopping the machine to move the bell-crank lever 514 and jack supporting rod 512 downwardly to move the jacked shoe out of engagement with the sewing devices. The eccentric drive above described, has for one of its functions in connection with the stopping of the machine to straighten this toggle and thereby to move the jacked shoe away from the sewing devices. As best shown in Figs. 2 and 27 of the drawings, the toggle mechanism comprises pivotally connected toggle arms 518 and 520, the toggle arm 518 being pivotally connected to the bell-crank lever 514, and the toggle arm 520 being secured to a laterally extending rock shaft 522. Abutting stop surfaces formed on the rear side of the toggle arms 518 and 520 are arranged to support the toggle arms in their straightened locking position. A tension spring 524 connected at its forward end to the toggle arm 520 and at its rear end to a point on the bell-crank lever 514, tends to rock the toggle arms rearwardly to break the toggle. The tension of this spring is, however, insufficient to break the toggle until it has been moved from its locked position to a substantially straightened and overbalanced position. This mechanism including the toggle arms 518 and 520 and spring 524 are so arranged that a downward pressure or jiggling action on the jack applied by the operator when jacking a new shoe through its action to straighten the toggle, will serve to break the toggle and allow the shoe to be forced upwardly into position against the sewing mechanism by the springs 516 acting on the bell-crank lever 514.

The connections through which the eccentric drive is rendered operative in stopping the machine to straighten the toggle and thereby to move the jacked shoe downwardly away from the sewing mechanism, comprise a vertically extending toggle control rod 526 which at its lower end passes through an aperture in a forwardly extending arm 528 formed integrally with the sleeve hub of the toggle link 520. A collar 530 supported on the lower end of the toggle control rod 526 by means of a pair of check nuts, is rendered operative by upward movement of the toggle control rod to engage with the under side of the arm 528, and to move the toggle to its straightened position. The toggle control rod, as best shown in Figs. 2, 22 and 25, is connected to one arm of a bell-crank lever 532, the other arm of which is connected by a link 534 with a lever arm 536 on the eccentric rock shaft 348. The clockwise rotational movement of the eccentric rock shaft to the dot-and-dash position shown in Fig. 21, acts through this connection to move the toggle to its straightened and locked position. As the jack supporting arm 148 is moved downwardly by the straightening of the toggle 518, 520, the jack is permitted to fall outwardly away from the machine under the influence of a tension spring 538 connected between a downward extension 540 of the jack spindle 144 and the jack supporting rod 512. The extent of this outward movement of the jack is limited by a chain 542 connected between the jack spindle 144 and a stationary point on the arm 148.

The device for locking the feed connections and the variable speed drive for the pattern cam shaft in their adjusted positions in accordance with the size of shoe being operated upon, is arranged to be locked by the downward movement of the foot treadle 316 in starting the machine, and to be again unlocked to permit the adjustment of this mechanism during the jacking of a new shoe by the breaking of the toggle 518, 520 in moving the newly jacked shoe to its operating position.

The inseam trimming mechanism provided in accordance with the present invention, as best shown in Figs. 4, 6, 10 and 11, comprises the trimming knife 130 having a tapered periphery which rotates in close proximity to the point of operation of the sewing devices including the curved hook needle 120 and channel guide 138 of the machine. The cutting edge of the knife 130 is adjustable in the line of feed and is spaced from the sewing devices including the curved hook needle 120 and channel guide 138 in the direction of the completed stitches of the seam by an amount which is sufficient only to cause the trimming knife to trim that portion of the sewing rib held together by the last completed or tightened stitch of the inseam. Under normal operating conditions the position of the knife will be adjusted so that its cutting edge will be approximately one-half inch to the left of the point of pivotal support of the shoe as determined by the engagement of the channel guide therewith.

As best shown in Fig. 10 of the drawings, the knife 130 consists of a tapered hollow shell which is secured to the face of a tapered hub member 548 by means of a tapered clamp disk 550 which fits within the base of the knife and is screw-threaded to a threaded sleeve projection 552 of the hub 548. The hub member is rotatably supported by means of two ball bearing rings 554 upon a bearing stud 556 fixedly mounted in a trimming head 558 which is mounted for adjustment on a sloping guideway 560 formed in a bracket 562 secured to the sewing head 104 of the machine. A rearwardly extending tubular extension 564 of the trimming head 558 provides support for a driving connection to the knife. As best shown in Figs. 10 and 11 of the drawings, the knife is continuously driven through connections from the main driving motor of the machine, which comprise a spiral gear 566 formed integrally with the driving member 160 of the machine main clutch, a spiral gear 568 meshing therewith, which is mounted on a stub shaft 570 rotatably supported in a bearing formed in the machine frame. The shaft 570 and gear 568 are connected with a short drive shaft 572 supported in two bearing rings 574 in the tubular extension 564 by means of a telescoping drive shaft comprising elements 576 and 578 which are connected respectively by means of universal joints with the shaft 570 and shaft 572. A bevel gear 580 formed on the shaft 572 meshes with a bevel gear 582 on the hub member 548 of the inseam trimming knife.

In the illustrated machine, a grinding mechanism is provided which is continuously operative to maintain the knife in a sharpened condition. This mechanism (see Figs. 5 and 7) comprises a grinding wheel 584 which is mounted on the lower end of a spindle 586 rotatably supported in bearings 588 provided in an upward extension of the cutter inseam trimming housing 589. The grinding wheel 584 is arranged to be driven from any convenient source of power as, for example, a small motor (not shown) through a belt 590 and pulley 592 on the spindle 586.

The sewing instrumentalities of the illustrated machine comprise the curved hook needle 120 which together with its supporting segment is carried on an oscillatory feed lever 600 having back and forth movement in the line of feed (see Figs. 7, 8 and 9). The needle feed lever is formed with a sleeve hub which is mounted on a vertical pivot shaft 602, and a rearwardly extending cam lever arm 604 which carries a follower roller 606 for engagement with a peripheral feed cam track in a cam disk 608 on the sewing cam shaft of the machine. The needle feed lever is formed at its forward extremity with a semi-circular cup-shaped shield 610 which carries a pivot stud 612. The needle 120 is mounted in a segmental support 614 pivoted on said stud. The needle is further supported against lateral strains by means of a needle guide 616 supported to turn on the sleeve hub of the needle segment and having an aperture formed in the outer end thereof to receive and support the curved shank of the needle.

Oscillatory movements are imparted to the needle segment 614 to cause the needle to pierce and to draw thread through the work by means of connections comprising a link 618 connected at one end to the segment 614 and at its other end to a lever 620 freely mounted to rotate on an axis provided by a transversely extending shaft 812. The lever 620 is connected by a link 624 with an upwardly extending lever arm 626 which is formed with a sleeve hub 628 on a transversely extending pivot shaft 630. An upwardly extending cam follower lever arm 632 formed on the sleeve hub 628 carries a roller 634 for engagement with a cam track formed in one face of the cam disk 608.

In accordance with the invention, the looper 122 and thread finger 124 are supported and arranged to cooperate with the curved hook needle 120 in such a manner as to substantially confine the movements of these elements and the sewing thread to that side of the sewing point away from the rotary tubular trimming knife 130 and thus to make possible the placing of the sewing mechanism and the trimming mechanism of the machine in close relation to one another at the point of operation on the margin of the shoe sole. As best shown in Figs. 6, 7, 10, and 14 to 16 inclusive of the drawings, the looper 122 is supported on a rock shaft 636 to turn on a small radius about an axis inclined forwardly from the vertical and substantially in line with the end of the needle in the needle threading position. The looper acts to carry the thread forwardly around the hook of the needle to the left in a counterclockwise direction while at the same time the thread finger 124 engages a portion of the thread extending between the looper and the work and moves substantially in the line of feed to the right away from the looper and needle and away from the tubular trimming knife 130, to assist in the needle wrap and to provide slack thread at the work side of the needle loop. As the needle is substantially withdrawn through the work and carries with it the needle loop, the thread finger again moves to the left to give up this excess thread.

The manner of looping around the needle to the left or in a counterclockwise direction which is contrary to the usual practice, has been found to have substantial advantages in the illustrated machine. While looping to the left in accordance with the illustration of Fig. 29, the supply side of the loop is placed to the flute side of the needle which results in a neat passage of the needle and thread through the stock, and substantially reduces the chances of thread abuse where sewing through metal staples is necessary. A further advantage of the illustrated method of thread handling as shown in Fig. 29, consists in the fact that the thread on the leading side of the needle can be positively controlled by the take-up lever without reaving thread in the barb of the needle. The possibility of such control is of substantial importance in that by a proper setting of the take-up lever action it is possible to keep that side of the loop extending toward the supply taut while back feeding the needle. The advantage of this mode of operation becomes evident particularly during the operation about the toe where the turning of the shoe causes a slight shortening of the cordal distance between the barb of the needle and the hole in the work, so that the needle tends to back feed out of the loop, and to drop stitches.

It has been found that the seam formed with the method of thread handling employed on the present machine, is substantially tighter than that which is formed with the more conventional method of looping the needle in a clockwise direction, in that that side of the loop extending from the supply and which is subject to the direct tightening action of the take-up is placed uppermost in the seam, tending to flatten and draw in the stitch, which permits close trimming of the inseam by the following inseam trimming cutter without risk of cutting the thread.

As best shown in Figs. 7 and 10, the supporting rock shaft 636 for the looper 122 is supported for rotational movement in a bore in a forwardly extending bracket 638 carried on the nose of the sewing head. The rock shaft 636 is provided at its upper end with a bearing collar 640 which engages against the upper end of the bearing support and is provided adjacent its lower end with a worm gear 642 which meshes with a worm 644 on a rearwardly extending driving sleeve 646 which is externally supported on a bearing formed on the bracket 638. A tapered pinion 648 formed on the rearward end of the driving sleeve 646 meshes with a correspondingly tapered gear segment 650 on one arm of a bellcrank lever 652 supported to turn on the sleeve hub of the needle actuating lever 620 (see Figs. 7 and 10). An upwardly extending arm of the bell-crank 652 is connected by a link 654 with an arm 656 which is loosely sleeved on a rock shaft 658 and is formed with a rearwardly extending cam lever arm 660. A roller 662 supported on the cam lever arm 660 is arranged for engagement with a cam track 664 formed in the face of a cam disk 666 secured to the driving gear 172.

The thread finger 124 is secured to the forward end of a drive shaft 668 which is mounted within the sleeve drive shaft 646. At its rear end the shaft 668 is formed with a bevelled gear segment 670 meshing with the bevelled gear segment 672 which constitutes one arm of a bell-crank 674 mounted to turn on the sleeve hub of the needle actuating lever 620, the other arm of which is connected by a link 676 with a downwardly extending lever arm 678 sleeved on the rock shaft 658. The sleeve hub of the lever 678 is formed with a rearwardly extending cam lever arm 680 which carries a roller 682 for engagement with a switch cam track 684 formed in the right hand face of the driving gear 172.

In stopping the machine, the thread finger 124 is moved an abnormal distance to the right into engagement with a thread gripper 688 where it is retained while the machine is stopped as shown in Fig. 15 to provide a gripping engagement with the thread end. For the stop position referred to, the thread extends upwardly at an angle from the sewing rib in the line of feed, so that the continued feed of the shoe to finish trim the inseam after the sewing mechanism has stopped, in accordance with the present invention, as hereinafter more fully set forth, is effective to bring the thread into the path of the rotary inseam trimming cutter to cut the thread. As best shown in Figs. 7, 14, 15 and 16, the cooperating thread gripper 688 takes the form of a thin stamping pivotally mounted on the shaft 668 and provided at its lower end with a semicircular recess or jaw to receive the hook of the thread finger 124. An upward extension of the thread gripper 688 is slotted to receive the end of a spring 690 which acts to bias the thread gripper jaw to the left against the thread finger 124. Movement of the thread gripper under the influence of its spring 690 is limited by engagement of a laterally extending stop surface 692 on the thread gripper with the under side of a projecting portion of the housing for the looper shaft (see Figs. 6 and 14). The reverse movement of the sewing cam shaft in stopping is utilized to move the thread finger to its gripping position. During this reverse movement, a lateral extension 694 of the stop lever 198 and roller 696 moving with the stop lever 198 in a clockwise direction as shown in Fig. 5, are arranged to engage with an upward extension 698 of the cam lever 680, thus forcing the cam lever 680 and its cooperating roller 682 outwardly into a switch portion of its cam track 684. This is the position of the parts shown in Figs. 5 and 7.

In accordance with the invention, the operating head which houses the inseam trimming knife and the several cooperating shoe sewing and side lasting devices in the compact operating relationship above described, is arranged to confine and to draw off the chips produced by the operation of the knife in such a manner as to avoid any possibility that the stitch forming devices may become clogged or that the proper handling of the thread be interfered with in any way. To this end the operating head 104 is constructed to provide a flange or shield 691 which covers the upper two-thirds approximately of the circular knife edge, and further has formed therein an exhaust passageway 693 which opens through the shield 691 and extends transversely of the sewing head to the right above the sewing instrumentalities and then upwardly to provide a suitable union with a conventional suction exhaust tube. For convenience of assembly the flange 691 and exhaust passageway are formed in the block 638 which is rigidly secured to and forms a unit with the operating head 104. With this construction, the chips formed by the operation of the knife are confined in the chamber formed by the hollow conical knife blade 130, the needle support or shield 610 and the flange 691, and are driven to the upper part of this chamber by the rotary action of the knife and by the force of suction, to be drawn off through the exhaust passageway 693.

The thread handling instrumentalities of the machine include additionally a thread take-up, a thread tensioning device and a thread break-stop mechanism which are substantially similar to corresponding mechanisms fully illustrated and described in the prior patent to Morrill No. 2,359,662, and will therefore be described only briefly in connection with Figs. 5 and 2 of the drawings. In the illustrated machine, a take-up lever 700 is provided supported to turn on a pivot 702, and arranged to be continuously oscillated by means of a cam on the sewing cam shaft 168. The take-up lever 700 acts against a thread tension provided by a tension wheel 704 to draw in the previous stitch, and thereafter to draw off additional thread from the supply through the tension. Tension is supplied by means of a brake lever 706 and a brake shoe 708 (see Fig. 2) which engages with a friction drum secured to turn with the tension wheel 704. The brake shoe 708 is held against the drum by means of a spring (not shown) which is arranged to control the amount of the tension during each sewing cycle. A downward extension 705 of the brake lever 706 engaging in a slot formed in the lock bolt carrier 192 provides means which is operative during the leftward movement of the lock bolt carrier in stopping the machine to disengage the thread tension. Since these mechanisms for controlling the thread tension and for disengaging the thread tension when the machine is stopped, are fully described and illustrated in already issued patents to Morrill, including Patent No. 2,359,662 above referred to, and do not specifically form any part of the present invention, further illustration or description thereof is omitted. As shown in Fig. 5 of the drawings, the thread drawn from the supply passes around the tension wheel 704, thence around an idler pulley 710 on a lever arm 712 forming part of the thread break-stop mechanism around a take-up pulley 714 on the take-up lever 700 and around an idler pulley 716, and thence to the looper 122.

The thread break-stop mechanism is arranged to be rendered operative by a downward and rearward movement of the auxiliary take-up arm 712 and roller 710 upon breakage of the thread, and acts through intervening connections to impart a rotary movement to the vertically arranged machine treadle rod 208 which is effective to trip the stop motion of the machine into operation. These connections include a detent 718 which is secured to turn with the auxiliary take-up lever 712 on a pivot pin 720 and is adapted upon breakage or failure of the thread to be brought into engagement with a continuously oscillated trip lever 724 which then turns about its point of engagement with the detent 718 to impart a rearward rocking movement to a vertically arranged manually operable machine stop lever 726 to which the trip lever 724 is pivotally connected. The stop lever 726 is connected through a rearwardly extending link 728 and a gear segment connection 730 (see Fig. 2) to rotate the vertically arranged machine treadle rod 208. A small compression spring 732 seated against an abutment on the lever 726 tends to maintain the lever in its forward inoperative position. Continuous oscillatory movement is imparted to the trip lever 724 by means of a vertically extending link 734 connected to an extension of a continuously oscillated gripper actuating cam lever 736 hereinafter to be described.

The operating devices of the illustrated machine include the welt guide 140 through which welt is supplied to the sewing point of operation, supporting and actuating means for the welt guide arranged to slightly advance and retract the welt guide support and to release the shoe during each sewing cycle, a welt severing knife which is arranged to be automatically operated to sever the welt at the end of the operation on the shoe, a welt slashing mechanism which is rendered operative automatically to slash that portion of the welt which is laid about the toe portion of the shoe, and a welt advancing finger which is arranged to act automatically after the welt has been severed to advance the leading end thereof into position for the starting of a new operation. Since these mechanisms are substantially similar to corresponding mechanisms fully illustrated and described in the Morrill Patent No. 2,359,662 above referred to, these parts will be referred to only briefly in connection with the illustration thereof in Figs. 2 and 5 of the drawings.

The welt guide 140, as best shown in Fig. 5, is carried on the forward end of a slotted bar 742 which is supported at its forward end on a pair of lever arms 744 loosely mounted on a pivot pin 746, and supported at its rear end on a pair of supporting arms 748 loosely supported to turn on a rock shaft 750. An upward extension of one of the arms 748 carries a cam roller 751 for engagement with a peripheral cam on the cam shaft 168 which is employed to periodically press the welt guide against the upper to support the shoe during a portion of each successive sewing cycle. The welt guide is then locked in its advanced position by the engagement of the tooth of a cam actuated pawl lever 752 with a fine toothed ratchet 753 secured to the welt guide supporting bar 742.

The welt slashing mechanism referred to, comprises a box-like structure 754 through which the welt is guided to the welt guide 140, and which houses a continuously reciprocating welt slashing knife 756 to which motion is imparted by means of a cam actuated lever 758. The welt slashing mechanism includes a welt guiding member 760 which is shiftable to move the welt into and out of the path of the reciprocating knife to start and to discontinue the welt slashing operation. The position of this movable guide is controlled from the linkage mechanism for operating the feed lever through connections (see Figs. 5, 18 and 22) which include a rearwardly extending control link 764, a bell-crank lever 766 and a vertically arranged plunger 768 which engages at one end against a horizontally disposed arm of the bell-crank 766, and at its other end is arranged to be acted upon by a cam 770 on the feed link 458.

The mechanism for severing the welt above referred to, comprises a welt severing knife 772 which is carried on the forward end of a slide 774 mounted for lengthwise movement in the welt guide supporting bar 742. The welt severing knife 772 is advanced across the edge of the welt guide 140 to sever the welt and to release the shoe after the completion of the operation upon the shoe by connections which include a gear segment 776 loosely mounted to turn on a pivot stud 778 carried in an upstanding bracket 780 on the welt guide supporting member 742. An actuating pin 782 on the segment 776 rides in a cam slot 784 formed in an actuating lever 786 rigidly secured to the rock shaft 750. The position of the actuating lever 786 is controlled by means of a link connection 788 pivotally connected at one end to a lever arm 789 on the rock shaft 750. The link 788 is connected at its rear end, as best shown in Figs. 18 to 22 inclusive, to a laterally extending arm 790 on the vertically arranged eccentric actuated rock shaft 348. The operation of the machine stop motion upon completion of the operation about a shoe to bring each of the operating parts of the machine to its stop rest position includes a clockwise and return rocking movement of the eccentric rock shaft 348 from the position shown in Fig. 18. Through link 788 a corresponding clockwise and return movement is imparted to the rock shaft 750 and segment 776 from the position shown in Fig. 5, to advance and retract the welt severing knife 772.

At the end of each successive operation on a shoe, after the welt has been severed to release the shoe, the severed end of the welt remaining in the welt guide is advanced into position for the start of the new shoe sewing operation by means of mechanism which comprises a welt advancing finger 792. As generally indicated in Figs. 2 and 5 of the drawings, the welt advancing finger is secured to the end of an axially shiftable rod 794 which is arranged to be actuated through an operating trip connection (not shown) from a rock shaft 796 which is connected to be actuated from the rock shaft 750 by means of a spiral gear 798 on the rod 796 and a gear segment 800 on the rock shaft 750. The arrangement of these parts is such that the return rocking movement of the eccentric and rock shaft 750 after the welt severing knife 772 has been advanced to sever the welt, is effective to impart a welt advancing movement to the finger 792.

The channel guide 138 riding in the stitch receiving channel provides a principal means for positioning the jacked shoe with relation to the shoe operating instrumentalities during the progress of the operation about the sole margin of the shoe. As previously noted, the jacked shoe is urged yieldably upwardly and outwardly against the channel guide which thus forms a focal point with reference to which the turning and tipping movements of the shoe take place to present successive portions of the shoe to the operating devices as the operation progresses around the margin of the shoe sole. A feature of the invention consists in the organization of the machine including the channel guide to provide a focal point for such turning and tipping movements which will enable separated portions of the sole margin of the shoe to be presented simultaneously in proper relation to each of the respective sewing and inseam trimming devices. In the illustrated form of the invention, the channel guide is located to engage against the sewing rib as closely as possible to the reciprocating needle in the line of feed. The pattern cams of the machine for controlling the turning, tipping and feeding movements of the jacked shoe are particularly constructed and arranged for this position of the channel guide to cause the sole margin of the shoe to be accurately positioned for the operation of the trimming knife as well as the sewing devices as the point of operation progresses about the shoe.

Further in accordance with the invention, the channel guide 138 of the present machine is arranged to be automatically adjusted vertically with relation to the stitch forming devices including the curved hook needle 120, and also with relation to the trimming knife 130 to vary the depth at which the sewing and inseam trimming operations take place during the progress of these operations about the sole margin of the shoe. In the starting position of the machine, the channel guide is located in an abnormally depressed position, and is then moved upwardly to a normal operating position as the point of the sewing and inseam trimming operations moves away from the breast line of the heel. As the sewing and inseam trimming mechanisms approach the breast line of the heel at the end of the combined operation about the shoe, the channel guide is again moved to its abnormally low position. The movement of the channel guide in this manner serves to compensate for the dislocation of the welt and upper, which may be caused by the bunching of material at the breast line of the heel, to insure the proper location of the initial and final stitches of the seam and the correct trimming of the terminal portions of the inseam held together by these stitches. The channel guide 138 is formed on the lower end of a vertically arranged slide 804 (see Figs. 5, 12 and 13) mounted in a guideway 806 in the block 638 forming part of the operating head 104. The vertical position of the channel guide is controlled by means of a forwardly extending channel guide control lever 808 which is secured to pivot shaft 812 and forms part of the channel guide and lasting gripper control mechanism hereinafter to be described.

Further in accordance with the invention, the illustrated machine is provided with a side lasting gripper which is arranged to cooperate with the sewing and inseam trimming mechanisms of the machine to draw in and to position successive portions of the upper along the sides of the shoe prior to the sewing operation for securing together the insole, upper and welt of the lasted shoe. In the preferred form of the invention illustrated, a side lasting gripper is employed which is substantially similar to that particularly illustrated and described in the Morrill Patent No. 2,323,347. In the preferred form of the invention here shown, the side lasting gripper is constructed and arranged to operate in a location which is substantially between the channel guide and welt guide of the machine. The grippers are so arranged with reference to these parts to permit movement of the jaws, opened to receive between them the edge of the upper, downwardly between the channel guide and welt guide to a level substantially opposite the base of the sewing rib. With this arrangement, it has been found that the gripper jaws are properly located to insure a firm gripping engagement with the upper, and will permit a strong up-draw movement of the gripper without any tendency to interfere with the tipping, turning or feeding movements of the shoe, or the position thereof with relation to the sewing and inseam trimming mechanisms.

The lasting gripper mechanism (see Figs. 5, 12 and 13) comprises specifically the smooth-faced gripper jaw 132 which is arranged to move downwardly and rearwardly between the upper and insole substantially to the base of the sewing rib, and the rough-surfaced gripper jaw 134 pivoted to the jaw 132 in such a manner that it is caused to move about its pivot in a general downward direction which avoids interference with the welt guide to a closed gripping position after the jaws have reached the limit of their downward movement. The gripper jaw 132 is rigidly secured to the forward end of a carrier cam lever 810, which is pivotally mounted on a rock shaft 811 and is formed with a rearward cam lever arm 814 carrying the roller 816 for engagement with a cam groove 815 formed in the face of a cam 817 on the sewing cam shaft 168. A tension spring 818 tends to urge the cam lever arm 814 and roller 816 outwardly against its cam to maintain a continuous reciprocatory movement of the gripper cam lever 810, the effect being to produce a yieldable down stroke and a positive up stroke of the gripper. The inner surface of the cam groove 815 is circular in shape, permitting the carrier cam lever 810 to be rocked positively to the inoperative position shown in Fig. 5, by means of a gripper throw-out mechanism hereinafter more fully to be described.

The gripper jaw 134 is pivotally mounted on a pin 820 on the carrier cam lever 810. The mechanism for moving the movable jaw 134 between its work engaging and open positions with relation to the gripper jaw 132 (see Figs. 12 and 13) comprises a cam lever 822 pivotally mounted intermediate its length on the pivot shaft 630 and a link 826 having at its forward end a pivotal connection with the movable gripper jaw 134, and at its rear end a yieldable connection with the forwardly extending arm of the cam lever 822. The yieldable connection referred to, consisting of a pin and slot connection and a tensioning spring 828, is provided for the purpose for imparting a yielding gripping action to the jaw 134 to grip theh work.

The positioning of the channel guide 138 and the starting and stopping of the operation of the lasting gripper 132, 134, are automatically controlled in timed relation to the transfer of the point of operation about the shoe by means of mechanism which comprises a cam 830 on the pattern cam shaft 240 (see Fig. 2), and a cam lever 832 which is supported on the vertical pivot shaft 390 and is provided with a cam roll 834 for engagement with the cam 830. The cam lever 832 is connected by means of a link 836 with one arm of the bell-crank lever 500, the other arm of which is connected by a link 840 with a lever arm 842 rigidly secured to the horizontally extending rock shaft 812 which, as above noted, has secured thereto the forwardly extending channel guide control lever 808. Rocking movement of the rock shaft 812 and control lever 808 to the extreme position in a counterclockwise direction, acts to depress the slide 804 and channel guide 138 to the abnormally low position shown in Fig. 5.

Rocking movement of the shaft 812 is employed also to move the side lasting gripper mechanism into and out of active operation through connections which comprise a gripper throw-out lever 844 loosely mounted on the rock shaft 812, and arranged for engagement with an upwardly extending arm 846 formed in the hub of the carrier cam lever 810. The sleeve hub of the throw-out lever 844 has formed in the face thereof, a pair of lugs 848 which engage within correspondingly slotted portions 850 in the hub of the channel guide control lever 808, the slots 850 being of somewhat greater width than the lugs 848 to provide for a limited amount of lost motion between these parts. A torsion spring 852 coiled about the sleeve hub of the throw-out lever 844 and connected at one end to the lever and at its other end to the channel guide control lever 808, acts to rock the throw-out lever 844 in a counterclockwise direction to a fully extended position with relation to the control lever 808 and rock shaft 812.

The operation of the mechanism for positioning the channel guide 138 and for throwing the gripper mechanism into and out of active operation is as follows: In the stop position of the machine illustrated in Fig. 2 of the drawings, the rock shaft 812 has been shifted to the extreme limit of its movement in a counterclockwise direction in which the channel guide control lever 808 is engaged with and has depressed the channel guide 138 to its extreme low position. For this position of the parts, the throw-out lever 844 has been brought into engagement with the arm 846 to rock the carrier cam lever 810 in a clockwise direction against the pressure of its spring 818 so that the follower roll 816 is engaged against the inner periphery of the closed cam slot 815, and the gripper jaws 132, 134 are shifted to their raised inoperative position. When the machine is started, and during the formation of the initial stitches of the seam, the rock shaft 812 is gradually rocked in a clockwise direction from the position shown in Fig. 5, causing the channel guide to be gradually raised to normal operating position. During this initial rocking movement, the throw-out lever 844 is retained in its throw-out position by the action of the torsion spring 852. Continued movement of the rock shaft 812 in a clockwise direction now acts through the lost motion connection provided by lugs 848 and slots 850 to positively move the throw-out lever 844 out of engagement with the lever arm 846, thus permitting the jaws 132, 134 to move downwardly into work engaging position under the pressure of spring 818. As the point of operation is transferred about the toe portion of the shoe, the rock shaft 812 is rocked in the return or counterclockwise direction, a sufficient distance to cause the throw-out lever 844 to be shifted to its throw-out position under the influence of the spring 852 to move the carrier cam lever 810 and gripper jaws 132, 134 supported thereon, out of engagement with the work. At the completion of the operation about the toe, the rock shaft 812 is rocked in a clockwise direction to again throw the side lasting gripper mechanism into lasting position. During the sewing and trimming of the final stitches of the seam at the completion of the operation on the shoe, the rock shaft 812 is again rocked in a counterclockwise direction first to render the side lasting gripper mechanism inoperative, and thereafter to gradually depress the channel guide to its extreme low position.

In accordance with the invention, means are provided for continuing the feeding movement of the shoe after the sewing operation has been completed to relatively advance the trimming knife for trimming the latter portion of the inseam held together by the final stitches of the seam. As previously noted, the trimming knife is located in relation to and is spaced from the sewing mechanism so that the trimming operation follows the sewing operation around the sole margin of the shoe. At the end of the sewing operation, the sewing mechanism is brought to rest in its normal stop position with the needle withdrawn from the work and with a portion of the thread leading from the looper to the work held by the gripping action of the thread finger and associated gripper for the starting of a new seam and with the welt severed. In accordance with a feature of the invention, the relative advancing movement thus imparted to the inseam trimming knife is employed also to sever the thread close to the work. The thread extending from the work is held tautly by the thread finger and engaging thread gripper at a rising angle from the sewing rib and in substantially the same vertical plane therewith so that the thread will with certainty be brought into the path of and be severed by the rotating inseam trimming knife.

In the illustrated embodiment of the invention in an automatic machine, mechanism is provided which is adapted to impart an additional advancing movement to the shoe only after the several operations asscociated with the discontinuing of the sewing operation have been performed, but before the shoe has been released from its position in engagement with the channel guide and while the jacked shoe remains under the control of the pattern cams to insure the proper positioning of the shoe with relation to the inseam trimming knife during the relative advancing movement of the shoe to complete the inseam trimming operation. The mechanism for relatively advancing the shoe to complete the trimming operation comprises connections controlled from the eccentric control mechanism for imparting an additional increment of movement to the feed lever 384 of the machine to finish the trimming operation thereon. The connections referred to, as best shown in Figs. 23 to 25 inclusive, comprise a bell-crank lever 860 which is mounted on a pivot pin 862 on the feed lever 384, and has a ball and socket connection with the feed link 446. It will be evident from an inspection particularly of Figs. 23 and 24, that a rocking movement imparted to the bell-crank 860 to the position shown in Fig. 24, will have the effect of moving the feed lever 384 leftwardly to the dot-and-dash position illustrated in Fig. 23, thus causing the inseam trimming knife 130 to be advanced to finish-trim the inseam. The operating connections for the bell-crank supplemental feed lever 860 comprise a link 864 connected at one end to the bell-crank 860 and at its other end to a bell-crank 866 carried on a pivot pin 868 in the base of the feed lever 384. The free arm of the bell-crank 866 is arranged to engage against one end of a plunger 870 mounted in an axial bore formed in the cross pin 385 for the feed lever 384. The plunger 870 bears at its other end against a cammed surface 872 on a sliding element 874 which is mounted on one end of a link 876 and is arranged for sliding movement through a slot 878 in the upper end of the cross pin 385. The link 876 is connected at its other end by means of a ball and socket connection to an arm 880 forming a rigid part of the bell-crank lever 532 of the connections from the machine stop motion eccentric for straightening the toggle connections to depress the jack. A tension spring 882 connected at one end to the bell-crank lever 866 and at its other end to a pin 884 on the feed lever 384 tends to move these connections in a direction to maintain the auxiliary feed bell-crank 860 in its fully seated position as shown in Fig. 23, and with the bell-crank 866 biased in a direction to retain the plunger 870 in its most fully extended position.

The operation of the illustrated automatic machine for the performance of the combined inseam sewing, inseam trimming and side lasting operations upon a shoe supported on a last when mounted on an automatic support, will be briefly described as follows:

Assuming that the machine is in its normal stop position as shown in the drawings, but with the main motor 108 of the machine running, and with the trimming knife 130 in operation, the operator will now mount a shoe supported on a last to be operated upon on the jack, and by jiggling or jarring the jacked shoe will break the toggle connection for holding the jack in its depressed position. The operator then moves the jacked shoe against the shoe operating devices so that the channel guide is engaged firmly in the stitch receiving channel, at the same time adjusting the shoe lengthwise so that the stitch forming mechanism is located at the breast line of the heel of the shoe, and thereafter steps on the starting treadle to start the machine. The operation of the foot treadle causes the feed adjustment to be locked in accordance with the position of the jacked shoe, causes the main clutch to be closed through which the pattern mechanism and the sewing mechanism are driven, and at the same time causes the lock bolt 190 to be withdrawn so that the sewing machine clutch mechanism is rendered operative to start the sewing mechanism. The sewing operation now starts, together with the operation of the pattern mechanism to feed and to position the shoe with relation to the inseam sewing, trimming and side lasting devices while the operation is transferred about the shoe. The continuously rotating trimming knife 130 operates as above noted to trim that portion of the inseam held together by the completed stitches of the seam. At the start of the operation the channel guide 138 is in its depressed position, and as the operation proceeds is moved slowly upwardly under the control of pattern cam 830 to its normal operating position with relation to the sewing and trimming mechanisms. The first stitches of the seam leaving the breast line of the heel are thus placed high and the starting end of the seam is trimmed at a correspondingly high level, the level of the stitching and trimming being thereafter gradually returned to normal as the operation proceeds. Under the control of the pattern cam 830, the side lasting gripper is rendered operative to draw in successive portions of the upper along the side of the shoe, the side lasting operation being discontinued during the operation about the toe of the jacked shoe and then being resumed during the operation along the other side of the shoe. As the inseam sewing and inseam trimming operations about the sole margin of the shoe approach completion, the channel guide 138 is again gradually depressed to its extreme low position, so that the needle in forming the final stitches of the seam at the breast line of the heel is caused to pass through the sewing rib at a high level, and the trimming knife is correspondingly raised to sew and to trim in a satisfactory manner the end portion of the seam. The side lasting operation is discontinued.

Upon completion of the sewing operation about the shoe, the treadle rod 208 controlling the machine stop motion is automatically released acting to disengage the main clutch, and also to shift the lock bolt associated with the sewing machine reverse stop motion mechanism to its operative position to stop the sewing mechanism. As previously described, the sewing mechanism stops with the needle withdrawn from the work, with a portion of the thread extending from the work engaged and gripped between the thread finger and the cooperating thread gripper member, and with the thread tension relieved. The movement of the lock bolt carrier associated with the sewing machine stop motion to reverse and to stop the sewing mechanism, is employed to bring the auxiliary eccentric mechanism of the machine stop motion into operation, causing the eccentric motion rock shaft to be rocked first in a clockwise direction and then in a counterclockwise direction. The initial rocking movement of the eccentric rock shaft in a clockwise direction is operative to put in operation the mechanism for severing the welt, and is operative in accordance with the present invention also to impart an additional feeding movement to the jacked shoe to cause the inseam trimming knife to complete the trimming operation upon the shoe. The return movement of the eccentric rock shaft is now effective to retract the welt severing knife, to cause the welt advancing finger to advance the severed end of the welt into position for the start of the new operation, to straighten the jack toggle connection to depress the jacked shoe out of engagement with the channel guide, and finally to complete the rotation of the pattern cam shaft of the machine so that the jacked shoe is rotated in the reverse direction to the initial position.

Certain features of applicant's machine relating to work feeding and positioning mechanisms form the subject matter of a divisional application, Serial No. 56,768, filed October 27, 1948, for Shoe Feeding and Positioning Mechanism, other features of applicant's machine relating specifically to a lacing and sewing mechanism and including a trimming mechanism form the subject matter of a divisional application, Serial No. 56,767, filed October 27, 1948, for Shoe Machines, and certain other features of applicant's machine relating specifically to a sewing mechanism form the subject matter of a divisional application, Serial No. 56,766, filed October 27, 1948, for Shoe Sewing Machines.

The invention having been described, what is claimed is:

1. In a machine for operating upon shoes, shoe operating means including a shoe sewing mechanism comprising stitch forming and shoe guiding devices arranged for sewing a seam about the sole margin of a shoe, a trimming mechanism for trimming surplus material from the sewn seam, a shoe supporting jack, and means for imparting relative feeding and positioning movements to the jacked shoe and operating means relative to said work guiding devices to cause the shoe to be presented properly to each of said shoe sewing and trimming mechanisms, and the operation of said mechanisms to be transferred about the shoe.

2. In a machine for operating upon shoes, shoe operating means including a shoe sewing mechanism comprising stitch forming devices arranged for sewing a seam about the sole margin of a shoe, a trimming mechanism including a knife operable to trim surplus stock from the seam, a guiding device associated with said operating means for positioning and for guiding a shoe with relation to said sewing and trimming mechanisms, and an automatic shoe support including a shoe supporting jack, and means for imparting relative feeding and positioning movements to the jacked shoe against said guiding device to cause the shoe to be presented properly at the same time to each of said shoe sewing and trimming mechanisms, and the operation of said mechanisms to be transferred about the shoe.

3. In a machine for operating upon shoes, shoe operating means including an inseam shoe sewing mechanism comprising stitch forming and shoe guiding devices, and an inseam trimming mechanism adapted for trimming the sewn inseam, a shoe supporting jack, and automatic means for imparting relative feeding and positioning movements to the jacked shoe and operating means against said shoe guiding device to transfer the operation about the sole margin of the shoe, and to cause the shoe to be presented properly at the same time to each of said inseam sewing and trimming mechanisms as the operation is transferred about the shoe.

4. In a machine for operating upon shoes, shoe operating means including an inseam shoe sewing mechanism, and an inseam trimming mechanism operative simultaneously for trimming the sewn seam, guiding means associated with said sewing and trimming mechanisms for positioning portions of the inseam with relation thereo simultaneously, a shoe suporting jack, and automatic means for imparting relative positioning movements to the jack and shoe operating means including said guiding means to cause the shoe to be presented properly at the same time to each of the inseam sewing and trimming mechanisms, and to cause the operation of said mechanisms to be transferred about the sole margin of the shoe.

5. In a machine for operating upon shoes, an inseam shoe sewing mechanism comprising stitch forming and shoe guiding devices, an inseam trimming mechanism spaced from the sewing mechanism to trim a portion of the inseam held together by the last completed stitches of the seam, a shoe supporting jack, and supporting and actuating mechanism for the jack arranged for imparting tipping, turning and feeding movements to the jack against the shoe guiding device to present the shoe properly at the same time to each of said sewing and inseam trimming mechanisms, and to transfer the operation about the sole margin of the shoe.

6. In a machine for operating upon shoes, an inseam shoe sewing mechanism comprising a curved hook needle and guiding means including a channel guide, an inseam trimming mechanism comprising a trimming knife spaced from the sewing mechanism to trim a portion of the inseam held together by the last completed stitches of the seam, a shoe supporting jack, and means for supporting the jack and shoe in engagement with said channel guide and for imparting feeding, turning and tipping movements to the jacked shoe with relation to said channel guide to present the shoe properly to said sewing and trimming mechanisms as the point of operation is transferred about the sole margin of the shoe.

7. In a machine for operating upon shoes, an inseam shoe sewing mechanism comprising a curved hook needle, an inseam trimming mechanism comprising a trimming knife arranged to operate simultaneously with the sewing mechanism and spaced from the sewing mechanism to trim a portion of the inseam held together by the completed stitches of the seam, guiding means adapted for guiding the shoe with relation to said simultaneously operating inseam sewing and inseam trimming mechanisms, a shoe supporting jack, and means for supporting and for imparting tipping, turning and feeding movements to the jack and shoe thereon with relation to said guiding means to present the shoe in operative relation to said sewing and inseam trimming mechanisms during the progress of the sewing and trimming operations about the sole margin of the shoe.

8. In a machine for operating upon shoes, an inseam shoe sewing mechanism including a curved hook needle and associated sewing and work guiding instrumentalities arranged for the continuous feed of the work relatively thereto, an inseam trimming mechanism arranged to operate simultaneously with the sewing mechanism and comprising a trimming knife located with relation to the sewing mechanism to trim a portion of the inseam held together by the last completed stitches of the seam, a shoe supporting jack, and means for supporting and for imparting tipping, turning and feeding movements to the jack and shoe supported thereon with relation to said guiding devices to present the shoe in operative relation to said sewing and inseam trimming mechanisms and to transfer the operation of said sewing and trimming mechanisms in a continuous movement about the sole margin of the shoe.

9. In a machine for operating upon shoes, an inseam shoe sewing mechanism comprising a curved hook needle and guiding means including a channel guide, an inseam trimming mechanism comprising a trimming knife located with relation to the sewing mechanism to trim a portion of the inseam held together by the completed stitches of the seam, a shoe supporting jack, an assembly of jack supporting levers movable to impart feeding and turning and tipping positioning movements to the jack including means to bias the jack upwardly and outwardly against the channel guide, and cam means acting on said levers to present the shoe to the sewing and trimming mechanisms and to transfer the operation of said sewing and trimming mechanisms about the sole margin of the shoe.

10. In a machine for operating upon shoes, mechanism for inserting fastenings along the sole margin of the shoe for securing together the sole and upper, trimming mechanism comprising a rotary tubular knife supported and arranged to cause the knife edge thereof to pass transversely across the sole margin to trim away surplus stock, and guiding means adapted for guiding the shoe with relation to each of said fastening inserting mechanism and trimming mechanism simultaneously.

11. In a machine for operating upon shoes, an inseam shoe sewing mechanism having stitch forming devices, an inseam trimming mechanism comprising a rotary tubular knife supported and arranged to cause the knife edge to pass transversely across a portion of the inseam held together by the last completed stitches of the seam, and shoe guiding means including a channel guide located with relation to the inseam sewing and trimming mechanisms for guiding the shoe with relation to each of said sewing and trimming mechanisms simultaneously.

12. In a machine for operating upon shoes, an inseam shoe sewing mechanism having stitch forming and work guiding devices, and an inseam trimming mechanism comprising a rotary tubular trimming knife located with relation to the sewing mechanism to trim a portion of the inseam held together by the completed stitches of the seam.

13. In a machine for operating upon shoes, an inseam shoe sewing mechanism having stitch forming and work guiding devices, and an inseam trimming mechanism comprising a rotary tubular trimming knife having the cutting segment thereof arranged to pass transversely across a sewn portion of the inseam, said cutting edge having a large radius to form a substantially flat cut across the seam.

14. An inseam chainstitch shoe sewing machine having, in combination, sewing mechanism comprising a curved hook needle, a looper, a thread finger movable to supply slack thread to the needle, and an inseam trimming mechanism arranged at that side of the needle with the completed stitches of the seam, said trimming mechanism comprising a knife edge arranged to move transversely across the line of stitching for trimming that portion of the inseam held together by the last completed stitches of the seam, and means for guiding the shoe with relation to said sewing and trimming mechanisms.

15. In a machine for operating upon shoes, an inseam sewing mechanism having stitch forming and work guiding devices, and an inseam trimming mechanism comprising a rotary tubular trimming knife constructed and arranged to cause the knife edge to pass transversely across a portion of the inseam held together by the last completed stitches of the seam, a shoe supporting jack and supporting and actuating mechanism for the jack arranged for imparting tipping, turning and feeding movements to the jack to present a shoe properly to each of said sewing mechanism and said inseam trimming knife and to transfer the operation about the sole margin of the shoe.

16. In a machine for operating upon shoes, an inseam shoe sewing mechanism having stitch forming devices including a needle, inseam trimming mechanism comprising a rotary tubular trimming knife having the cutting segment thereof arranged to pass transversely across a portion of the inseam held together by the last completed stitches of the seam, said cutting edge having a large radius to form a substantially flat cut across the seam, a channel guide, and an automatic shoe support including a shoe supporting jack, and supporting and actuating connections for the jack adapted to impart positioning movements to the jacked shoe about its point of contact with the channel guide to present the shoe simultaneously to each of said inseam trimming and sewing mechanisms during the transfer of the operation about the shoe.

17. In a machine for operating upon shoes, an inseam shoe sewing mechanism having stitch forming and work guiding devices, an inseam trimming mechanism comprising a rotary tubular trimming knife located with relation to the sewing mechanism to trim a portion of the inseam held together by the last completed stitches of the seam, and a thread guard extending between the knife and the sewing mechanism.

18. In a machine for operating upon shoes, shoe operating means comprising an inseam shoe sewing mechanism and an inseam trimming mechanism for trimming the sewn portion of the inseam, said trimming mechanism comprising a rotary tubular knife supported and arranged to cause the knife edge to pass transversely across a portion of the inseam held together by the last completed stitch of the seam, said inseam sewing mechanism including a curved hook needle and a pivotal support on which the needle is movable in the line of feed, and a thread guard interposed between the needle and the knife supported to move with the needle in the line of feed.

19. In a machine for operating upon shoes, means for operating upon the sole margin of a shoe supported on a last, which comprises a sewing mechanism having a curved hook needle, a looper, a thread finger, and a rotary tubular inseam trimming knife supported and arranged to cause the knife edge to pass transversely across a portion of the inseam held together by the completed stitches of the seam.

20. In a machine for operating upon shoes, means for operating upon the sole margin of a shoe supported on a last, which comprises a sewing mechanism having a curved hook needle, a looper, and a thread finger movable substantially in the line of feed, and a rotary tubular inseam trimming knife supported and arranged to cause the knife edge to pass transversely across a portion of the inseam held together by the completed stitches of the seam, and a guard element between the sewing and inseam trimming mechanisms to support the thread out of the path of movement of the knife.

21. In a machine for operating upon shoes, sewing mechanism having a curved hook needle, a looper, and a thread finger movable substantially in the line of feed away from the completed stitches of the seam, a rotary tubular inseam trimming knife supported and arranged to cause the knife edge to pass transversely across the inseam held together by the last completed stitches of the seam, and a suction exhaust conduit constructed and arranged to draw off and away from the sewing mechanism chips formed by the rotary knife.

22. In a machine for operating upon shoes, means for operating upon the sole margin of a shoe supported on a last, which comprises a sewing mechanism having a curved hook needle, a looper and a thread finger movable substantially in the line of feed, a rotary tubular inseam trimming knife supported and arranged to cause the knife edge to pass across a portion of the inseam held together by the last completed stitches of the seam, a guard element between the sewing and inseam trimming mechanisms to support the thread out of the path of movement of the knife and chips formed by the knife, and a chip suction exhaust conduit for the disposal of said chips.

23. In a machine for operating upon shoes, shoe operating means including a sewing mechanism which comprises a curved hook needle, a looper, a thread finger movable substantially in the line of feed away from the completed stitches of the seam, supporting and actuating means including a support on which the needle is movable in the line of feed, inseam trimming mechanism comprising a rotary tubular inseam trimming knife supported and arranged to cause the knife edge to pass across a portion of the inseam held together by the last completed stitches of the seam, a thread guard interposed between the needle and the knife supported to move with the needle in the line of feed, and a chip suction exhaust conduit enclosing that portion of the knife edge above the needle for disposal of chips formed by the knife.

24. In a machine for operating upon shoes, shoe operating means comprising an inseam shoe sewing mechanism and an inseam trimming mechanism for trimming the sewn portion of the inseam, said trimming mechanism comprising a rotary tubular cutter and means for rotating the cutter, and said sewing mechanism comprising a curved hook needle, a needle segment rotatable to cause the needle to enter the work from the outside and to emerge in the stitch receiving channel, a support for said pivoted needle segment arranged for movement in the line of feed, a rotary looper, and a thread finger arranged to draw a bight of thread along the line of feed in a direction away from the completed stitches of the seam.

25. In a machine for operating upon shoes, means for operating upon the sole margin of a shoe supported on a last, which comprises with an inseam trimming mechanism having a rotary tubular cutter for trimming a sewn portion of the inseam, and means for continuously rotating the cutter, an inseam sewing mechanism having a curved hook needle, a looper, and a thread finger arranged to engage with and draw a bight of thread in a direction substantially parallel to the line of feed and away from the cutter.

26. In a machine for operating upon shoes, a shoe operating means comprising an inseam shoe sewing mechanism and an inseam trimming mechanism, said trimming mechanism comprising a knife, and means for actuating the knife to trim a portion of the inseam held together by the last completed stitches of the seam, said sewing mechanism comprising a curved hook needle, a looper, and a thread finger arranged to draw its bight of thread generally in the direction of feed and away from the knife.

27. In a machine for operating upon shoes, an inseam shoe sewing mechanism comprising a curved hook needle, a thread finger, and a rotary looper movable forwardly in a counterclockwise direction to loop the thread about that side of the needle hook adjacent the completed stitches of the seam, whereby the supply leg of the chain loop forming the completed stitch is caused to overly the leg extending from the previously formed stitch in the seam, and an inseam trimming knife arranged for trimming the last completed stitches of the seam.

28. In a machine for operating upon shoes, an inseam shoe sewing mechanism comprising a curved hook needle, a thread finger, and a rotary looper movable forwardly in a counterclockwise direction to loop the thread about that side of the needle hook adjacent the completed stitches of the seam, whereby the supply leg of the chain loop forming the completed stitch is caused to overly the leg extending from the previously formed stitch in the seam, an inseam trimming mechanism comprising a continuously rotating tubular knife arranged to cause the knife edge to pass transversely across the seam, and work guiding devices supported and arranged with respect to the inseam sewing and trimming mechanisms to permit the shoe to be presented in position for the simultaneous operation of said mechanisms.

29. In a machine for operating upon shoes, an inseam shoe sewing mechanism comprising a curved hook needle, a rotary looper movable forwardly in a counterclockwise direction to loop the thread about that side of the needle hook adjacent the completed stitches of the seam, a thread finger movable to draw thread in the line of feed away from the completed stitches of the seam, actuating connections for the looper and thread finger comprising a forwardly extending thread finger supporting and actuating shaft, and a looper actuating shaft co-axial therewith, and a looper supporting shaft disposed in angular relation to and operatively connected to be driven from said looper actuating shaft, and a rotary tubular inseam trimming knife disposed to cause the cutting edge thereof to move transversely of the line of feed to trim the last completed stitches of the seam.

30. In a machine for operating upon shoes, an inseam shoe sewing mechanism and an inseam trimming mechanism, said trimming mechanism comprising a rotary tubular knife having the cutting edge thereof passing transversely across the line of feed to trim the last completed stitches of the seam, and said sewing mechanism comprising a curved hook needle, a looper, a thread finger arranged to provide slack thread to the needle, and supporting and operating devices for said sewing instrumentalities located substantially entirely at that side of the needle away from the knife.

31. In a machine for operating upon shoes, an inseam shoe sewing mechanism and an inseam trimming mechanism, said trimming mechanism comprising a rotary tubular knife having the cutting edge thereof passing transversely across the line of feed to trim the last completed stitches of the seam, and said sewing mechanism comprising a curved hook needle, a looper, a thread finger movable in the line of feed away from the knife to provide slack thread to the needle, and supporting and operating devices for said sewing instrumentalities located substantially entirely at that side of the needle away from the knife.

32. In a machine for operating upon shoes, an inseam shoe sewing mechanism and an inseam trimming mechanism, said trimming mechanism comprising a rotary tubular knife having the cutting edge thereof passing transversely across the line of feed to trim the last completed stitches of the seam, and said sewing mechanism comprising a curved hook needle, a looper, a thread finger arranged to provide slack thread to the needle, supporting and operating devices for said sewing instrumentalities located substantially entirely at that side of the needle away from the knife comprising a forwardly extending thread finger supporting and actuating shaft, a looper actuating shaft co-axial therewith, and a looper supporting shaft disposed in angular relation to and operatively connected to be driven from said looper actuating shaft.

33. In a machine for operating upon shoes, means for operating upon the sole margin of a shoe supported on a last, which comprises an inseam sewing mechanism comprising a curved hook needle arranged to enter the work from the outside and to emerge from the stitch receiving channel in the insole, a looper, a thread finger movable to provide slack thread for the needle, an inseam trimming mechanism cooperating with the sewing mechanism to trim that portion of the inseam held together by the last completed stitches of the seam, means for operating said trimming mechanism, a stop motion for the sewing mechanism, and a thread gripping device which comprises a relatively stationary thread gripping element, and means operative in stopping the sewing mechanism to impart an abnormal movement to the thread finger to grip the thread between the thread finger and said surface.

34. In a machine for operating upon shoes, an inseam shoe sewing mechanism comprising a curved hook needle, a looper and a thread finger movable to draw thread in the line of feed away from the completed stitches of the seam, an inseam trimming mechanism comprising an inseam trimming knife, and driving means for continuously actuating the knife, driving and stopping mechanism for the sewing mechanism, and means operative upon stopping the sewing mechanism to engage and to support a portion of the thread extending from the work in the path of the inseam trimming knife to sever the thread from the shoe comprising a gripper member and means operative in stopping the sewing mechanism to impart an abnormal thread draw movement to the thread finger to engage the thread against said gripper.

35. In a machine for operating upon shoes, means for operating upon the sole margin of a shoe, which comprises an inseam shoe sewing mechanism having a curved hook needle, a looper, and a thread finger movable to supply slack thread to the needle, an inseam trimming mechanism comprising a rotary tubular knife arranged at that side of the sewing mechanism with the completed stitches of the seam for trimming a sewn portion of the inseam, a stop motion operative to stop the sewing mechanism, and means operative in stopping the machine to grip the thread comprising means for imparting an abnormal movement to the thread finger, and a cooperating relatively stationary gripping element brought into cooperative relation with the thread finger by said abnormal movement to grip the thread.

36. In a machine for operating on shoes, the combination of an inseam shoe sewing mechanism and an inseam trimming mechanism comprising a rotary tubular knife located at the side of the sewing mechanism with the completed stitches of the seam for trimming the sewn inseam, and power means for rotating the knife, of which the sewing mechanism comprises a curved hook needle arranged to enter the work from the outside and to emerge from the stitch receiving channel, a looper, and a thread finger movable back and forth substantially along the line of feed to draw a bight of thread in a direction away from the knife, means for stopping the sewing mechanism in a predetermined stop position, and a thread gripping device comprising a relatively stationary gripping surface and a cooperating gripping surface on the thread finger, and means controlled from the stop mechanism for imparting an abnormally long draw movement to the thread finger to cause said surfaces to be brought into gripping relation to grip the thread therebetween with a portion of the thread extending from the work positioned to be severed by the knife.

37. In a machine for operating upon shoes, means for operating upon the sole margin of a shoe, which comprises an inseam shoe sewing mechanism comprising a needle, a looper, and a thread finger, an inseam trimming mechanism comprising a trimming knife operable to trim that portion of the inseam held together by the last completed stitches of the seam, driving means for actuating the knife, driving and stopping mechanism for the sewing mechanism, and means operative upon stopping the sewing mechanism to engage and support a portion of the thread extending from the work in the path of the inseam trimming knife to cause the thread to be severed from the shoe.

38. In a machine for operating upon shoes, an inseam shoe sewing mechanism an inseam trimming mechanism including a knife operative to trim a sewn portion of the inseam, means acting when rendered operative to stop the sewing mechanism while the inseam trimming mechanism continues to operate, and means operative upon the stopping of the sewing mechanism to grip and to support a portion of the thread extending from the work across the path of operation of the trimming knife to sever the held thread from the work.

39. In a machine for operating upon shoes, an inseam shoe sewing mechanism, an inseam trimming mechanism including a knife operative to trim a sewn portion of the inseam, a feed mechanism for advancing the shoe with relation to the sewing and inseam trimming mechanisms, means acting when rendered operative to stop the sewing mechanism while the inseam trimming mechanism continues to operate, a thread gripper located and arranged to grip and to support a portion of the thread extending from the work across the path of operation of the trimming knife to sever the held thread from the work, and means operable upon stopping the machine for actuating the thread gripper to grip the thread.

40. In a machine for operating upon shoes, an inseam shoe sewing mechanism, an inseam trimming mechanism including a knife operative to trim a sewn portion of the inseam, a feed mechanism for advancing the shoe with relation to the sewing and inseam trimming mechanisms, means acting when rendered operative to stop the sewing mechanism while the inseam trimming mechanism continues to operate, and a thread gripper located to position a portion of the thread extending from the work in the path of the knife, and means acting after the sewing mechanism has stopped for imparting an additional advancing movement to the shoe to complete the trimming of the inseam and to sever the thread.

41. In a machine for operating upon shoes, means for operating upon the sole margin of a shoe comprising an inseam shoe sewing mechanism, and an inseam trimming mechanism including a trimming knife operative to trim a sewn portion of the inseam, means for operating the trimming mechanism, a driving and stopping mechanism for the sewing mechanism, means operative in stopping the sewing mechanism to grip the thread extending from the work, and means acting after the sewing mechanism is stopped for relatively moving the shoe and inseam trimming mechanism to sever the gripped thread from the work.

42. In a machine for operating upon shoes, shoe operating mechanism comprising an inseam shoe sewing mechanism including a curved hook needle, a looper, a thread finger arranged to draw a bight of thread substantially in the direction of feed away from the cutter, a thread gripper arranged to cooperate with the thread finger upon stopping the machine to grip the thread, and a channel guide, an inseam trimming mechanism comprising a rotary tubular cutter and means for rotating the cutter, a shoe supporting jack, and supporting and actuating mechanism for the jack arranged for imparting tripping, turning and feeding movements to the jack to present the shoe properly to each of said sewing and inseam trimming mechanisms and to transfer the operation about the sole margin of the shoe, means acting when rendered operative to stop the sewing mechanism while the inseam trimming mechanism and feed mechanism continue to operate, means operative in stopping the sewing mechanism for moving the thread finger to grip the thread between the thread finger and thread gripper, and means acting after the sewing mechanism has stopped for moving the jack and shoe relatively to the inseam trimming mechanism to sever the gripped thread from the work.

43. In a machine for operating upon shoes, mechanism for inserting fastenings along the sole margin of the shoe for securing together the sole and upper, trimming mechanism comprising a trimming cutter spaced from the fastening mechanism for trimming surplus stock from the last fastened portion of the seam, means for feeding and for guiding the shoe with relation to said fastening and trimming mechanisms simultaneously, power operated means for driving each of said trimming and fastening mechanisms, and means for stopping the fastening mechanism while the trimming mechanism continues to operate.

44. In a machine for operating upon shoes, mechanism for inserting fastenings along the sole margin of the shoe for securing together the sole and upper, trimming mechanism comprising a trimming cutter spaced from the fastening mechanism for trimming surplus stock from the last fastened portion of the seam, means for feeding and for guiding the shoe with relation to said fastening and trimming mechanisms simultaneously, power operated means for driving each of said trimming and fastening mechanisms, means for stopping the fastening mechanism while the trimming mechanism continues to operate, and means for further advancing the shoe with relation to the trimming mechanism after the attaching mechanism has stopped to complete the trimming of the last fastened portion of the seam.

45. In a machine for operating upon shoes, mechanism for inserting fastenings along the sole margin of the shoe for securing together the sole and upper, trimming mechanism comprising a trimming cutter spaced from the fastening mechanism for trimming surplus stock from the last fastened portion of the seam, means associated with the fastening mechanism for feeding the shoe, driving means, a stop mechanism acting when rendered operative to stop said fastening mechanism and said means for feeding the shoe therewith, and means to further advance the shoe with relation to the trimming cutter to trim the last fastened portion of the seam.

46. In a machine for operating upon shoes, an inseam shoe sewing mechanism including a curved hook needle, an inseam trimming mechanism including a knife operable to trim a portion of the inseam held together by the completed stitches of the seam, power operated means for driving each of said trimming and sewing mechanisms, means for stopping the sewing mechanism while the trimming mechanism continues to operate, and means for advancing the shoe with relation to the trimming mechanism after the sewing mechanism has stopped to complete the trimming of the sewn seam.

47. In a machine for operating upon shoes, an inseam shoe sewing machine, an inseam trimming mechanism including a knife operable to trim a portion of the inseam held together by the completed stitches of the seam, means for feeding the shoe to advance the inseam sewing and trimming operations about the sole margin of the shoe, power operated means for driving each of said sewing and trimming mechanisms, means for stopping the sewing mechanism while the trimming mechanism continues to operate, and auxiliary means for feeding the shoe with relation to the trimming mechanism after the sewing mechanism has stopped to complete the trimming of the sewn seam.

48. In a machine for operating upon shoes, an inseam shoe sewing mechanism, an inseam trimming mechanism comprising a rotary tubular knife arranged to cause the knife edge to pass transversely across that portion of the inseam held together by the last completed stitches of the seam, means for feeding and for guiding the shoe with relation to said sewing and trimming mechanisms simultaneously, power operated means for driving each of said sewing and trimming mechanisms, and means for stopping the sewing mechanism while the trimming mechanism continues to operate.

49. In a machine for operating upon shoes, an inseam shoe sewing mechanism, an inseam trimming mechanism comprising a rotary tubular knife arranged to cause the knife edge to pass transversely across that portion of the inseam held together by the last completed stitches of the seam, means for feeding and for guiding the shoe with relation to said sewing and trimming mechanisms simultaneously, power operated means for driving each of said sewing and trimming mechanisms, means for stopping the sewing mechanism while the trimming mechanism continues to operate, and auxiliary means for imparting an auxiliary feeding movement to the shoe with relation to the trimming mechanism after the sewing mechanism has stopped to complete the trimming of the sewn seam.

50. In a machine for operating upon shoes, an inseam shoe sewing mechanism, an inseam trimming mechanism including a knife operable to trim a portion of the inseam held together by the completed stitches of the seam, means for imparting relative positioning movements to the jack and shoe operating means to cause the shoe to be presented properly to the inseam sewing mechanism and to the inseam trimming mechanism associated therewith, a stop mechanism for the machine operative upon completion of the sewing operation to stop the sewing mechanism, and operative thereafter to continue said relative movement to complete the operation of trimming the sewn inseam.

51. In a machine for operating upon shoes, means for operating upon the sole margin of a shoe, which comprises an inseam shoe sewing mechanism having a curved hook needle, an inseam trimming mechanism comprising a trimming knife arranged for trimming a portion of the inseam held together by the last completed stitches of the seam, a shoe supporting jack, supporting and actuating mechanism for the jack arranged to impart tipping, turning and feeding movements to the jack to transfer the operation about the sole margin of the shoe, a stop mechanism operative upon completion of the sewing operation to stop the sewing mechanism with the needle withdrawn from the work, and means acting thereafter to continue the advance of the shoe for the completion of the operation to trim the sewn inseam to disengage the jacked shoe from the operating mechanism.

52. In a machine for operating upon shoes, shoe operating means including an inseam shoe sewing mechanism, and an inseam trimming mechanism comprising a rotary tubular trimming knife supported and arranged to cause the knife edge to pass transversely across that portion of the inseam held together by the last completed stitches of the seam, guiding means for the shoe comprising a vertically adjustable channel guide, a shoe supporting jack, means for imparting relative positioning movements to the jack and shoe operating means to cause the shoe to be engaged against the channel guide to be presented properly at the same time to each of the inseam sewing and trimming mechanisms and to cause the operation of said mechanisms to be transferred about the sole margin of the shoe, and means timed with relation to the transfer of said operation about the shoe to relatively depress the channel guide at the end of the operation upon the shoe, and to return the channel guide to its raised normally operative position at the start of an operation about the shoe.

RUTH W. MORRILL,
*Administratrix of the Estate of Alfred R. Morrill, Deceased.*

REFERENCES CITED

The following references are of record in the file of this patent:

UNITED STATES PATENTS

| Number | Name | Date |
|---|---|---|
| 579,697 | Coupal | Mar. 30, 1897 |
| 2,222,972 | Ashworth | Nov. 26, 1940 |
| 2,359,662 | Morrill | Oct. 3, 1944 |
| 2,359,664 | Morrill | Oct. 3, 1944 |
| 2,359,729 | Morrill | Oct. 3, 1944 |